(12) United States Patent
Vuggrala et al.

(10) Patent No.: US 11,778,467 B2
(45) Date of Patent: Oct. 3, 2023

(54) PRECACHING PRECURSOR KEYS WITHIN A ROAMING DOMAIN OF CLIENT DEVICES

(71) Applicant: HEWLETT PACKARD ENTERPRISE DEVELOPMENT LP, Houston, TX (US)

(72) Inventors: Shravan Kumar Vuggrala, Bangalore (IN); Raghunandan Prabhakar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 58 days.

(21) Appl. No.: 17/513,868

(22) Filed: Oct. 28, 2021

(65) Prior Publication Data
US 2023/0135840 A1 May 4, 2023

(51) Int. Cl.
*G06F 21/00* (2013.01)
*H04W 12/069* (2021.01)
*H04W 12/088* (2021.01)
*H04W 8/12* (2009.01)

(52) U.S. Cl.
CPC ........... *H04W 12/069* (2021.01); *H04W 8/12* (2013.01); *H04W 12/088* (2021.01)

(58) Field of Classification Search
CPC ... H04W 12/069; H04W 12/088; H04W 8/12; H04W 12/0431
See application file for complete search history.

(56) References Cited

U.S. PATENT DOCUMENTS

| | | | | |
|---|---|---|---|---|
| 7,227,863 B1* | 6/2007 | Leung | ..................... | H04W 8/12 370/432 |
| 11,496,391 B1* | 11/2022 | Przygienda | ........... | H04L 45/745 |
| 2007/0291705 A1* | 12/2007 | Iyer | ......................... | H04W 8/04 370/338 |
| 2012/0176914 A1* | 7/2012 | Choudhury | ............. | H04L 45/00 370/248 |
| 2013/0305332 A1* | 11/2013 | Narasimhan | ...... | H04W 36/0038 726/7 |
| 2014/0010223 A1* | 1/2014 | Wang | .................... | H04W 76/11 370/338 |

(Continued)

OTHER PUBLICATIONS

Wikipedia, "Mobile IP", retrieved from <https://en.wikipedia.org/wiki/Mobile_IP>, Sep. 17, 2021, 5 pages.

*Primary Examiner* — Kendall Dolly
(74) *Attorney, Agent, or Firm* — Sheppard Mullin Richter & Hampton LLP

(57) ABSTRACT

Examples relate to seamless roaming across subnets. In an example, a system receives an indication that a client device has been authenticated at a first network device of a network. The system receives precursor keys and identification information of the client device, as generated from the authentication of the client device. The system determines second clusters, which are within a roaming domain of the cluster or the client device. The system receives one or more second precursor keys corresponding to the second clusters and distributes the second precursor keys to the corresponding second clusters. The system determines to create one or more tunnels among the second clusters and the cluster and provisions the tunnels to transmit data through the tunnels.

20 Claims, 13 Drawing Sheets

(56) References Cited

U.S. PATENT DOCUMENTS

| | | | |
|---|---|---|---|
| 2014/0362807 A1* | 12/2014 | Bhatnagar | H04W 12/068 370/329 |
| 2015/0110115 A1* | 4/2015 | He | H04L 45/74 370/392 |
| 2019/0356482 A1* | 11/2019 | Nix | H04L 63/0823 |
| 2023/0136635 A1* | 5/2023 | Mishra | H04L 41/0893 370/254 |

* cited by examiner

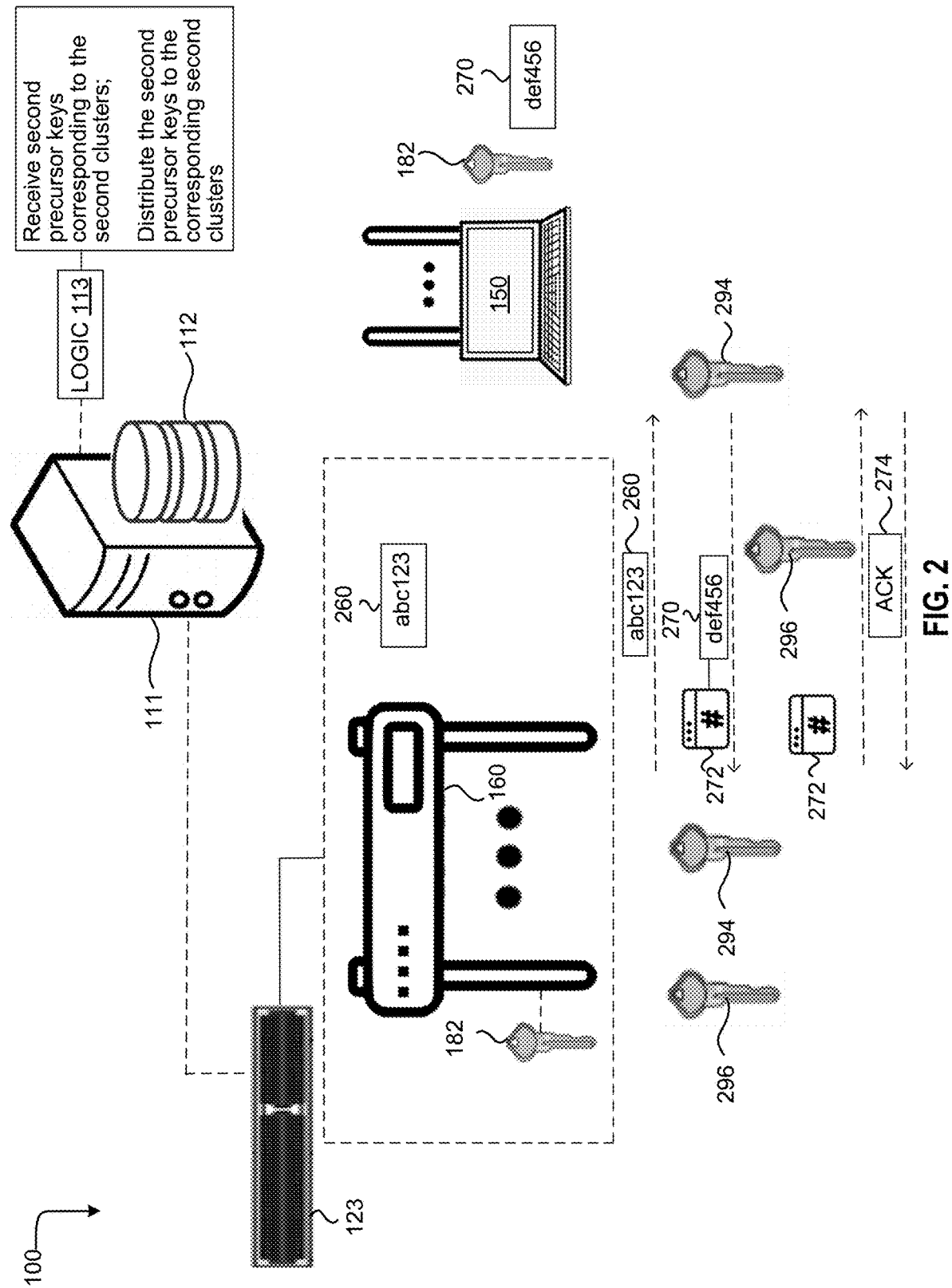

PRECACHING PRECURSOR KEYS WITHIN A ROAMING DOMAIN OF CLIENT DEVICES

BACKGROUND

An Open Systems Interconnection (OSI) Model describes a conceptual framework of a networking system, including different modes of interaction between components of the networking system in each of the seven layers of the OSI Model. The first three layers of the OSI Model include the physical layer (L1), the data link layer (L2), and the network layer (L3), which altogether form the media layers. The physical layer specifies physical components such as hubs, cables, network devices such as adapters, routers, switches, and access points, along with parameters, specifications, or attributes of or related to the physical components. These specifications may include voltages, pin layouts, cabling specifications, and radio frequencies. Meanwhile, the data link layer specifies the mechanisms of packaging data into frames and transmitting the data over a network. The data link layer further encompasses a media access control (MAC) sub-layer, which provides transmission of frames among two nodes, or client devices, in a same network using MAC addresses and a logical link control (LLC) layer which is responsible for identifying and encapsulating network layer protocols, and controlling frame error checking and frame synchronization. Next, the network layer specifies the routing of data, in a format of packets, across different subnets. Subnets may represent logical demarcations of a particular network in an effort to reduce congestion and to more effectively manage and control security of data. In one example, different subnets have different access privileges of data.

Roaming enables client devices to seamlessly and securely access data over different locations by connecting to different network devices. Therefore, when a client device moves beyond a range of a particular network device, that client device may connect to a different network device without interruption or delay. Roaming may take place over L2 or L3. A L2 roam entails a client device moving out of a range of one access point and reassociating with a different access point in a common network and/or subnet. Meanwhile, a L3 roam entails a client device moving into a different subnet. Typically, when a client device roams over L2 or L3, the client device is reauthenticated at the new access point.

BRIEF DESCRIPTION OF THE DRAWINGS

The present disclosure, in accordance with one or more various examples, is described in detail with reference to the following figures. The figures are provided for purposes of illustration only.

FIG. 2 illustrates an example of a four-way handshake between a client device and an access point or a controller to generate additional keys that facilitate the transmission of encrypted data between an access point and a client device, according to examples described in the present disclosure.

Figure 1A:
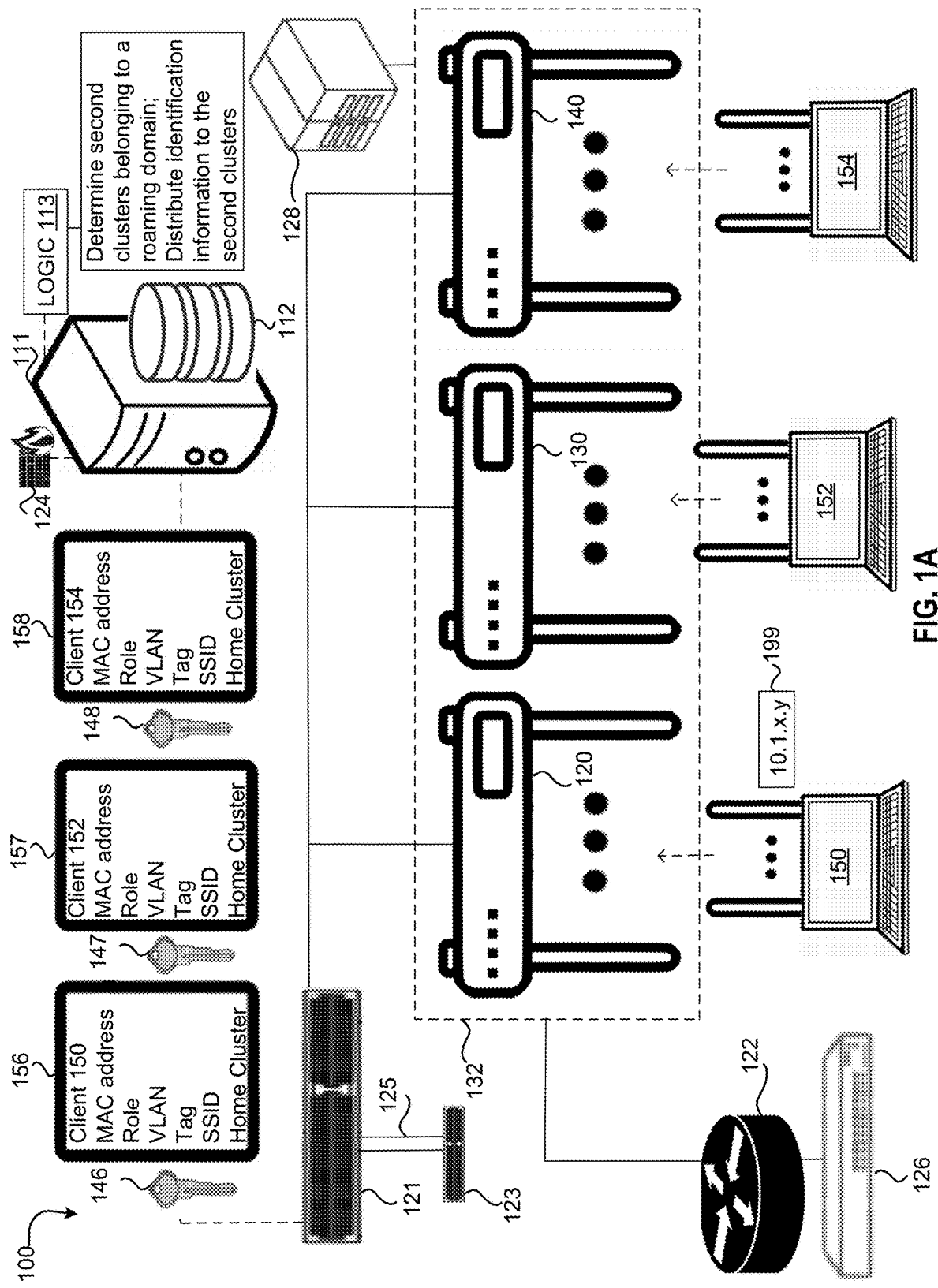
FIG. 1A is an example illustration of a computing system that streamlines a roaming process of client devices among different clusters or subnets, according to examples described in the present disclosure.

The figures are not exhaustive and do not limit the present disclosure to the precise form disclosed.

DETAILED DESCRIPTION

Certain aspects of streamlining roaming of client devices among different segments or subnets (hereinafter "subnets") in a network while reducing or minimizing delays, are described below. Client devices may include, without limitation, mobile devices such as mobile phones and tablets, personal digital assistances (PDAs), desktops, laptops, that have wireless adapters or other functionality that enables connection to a network. In particular, traditional mechanisms of roaming may entail authentication of a client device at a new access point or new subnet to which the client device is seeking to reassociate. This authentication may include the computation, transmission, exchange, and verification of keys used to encrypt data that is exchanged between the client device and the new access point, new subnet or new cluster.

One reason for a client device roam may be attributed to the client device (e.g., supplicant) detecting a decreasing signal strength as indicated, for example, by a Received Signal Strength Indicator (RSSI) during a connection to an access point. That client device may perform a scan and transmit probe packets to determine whether a different access point (e.g., authenticator) would provide a better signal strength. Herein, "client device" and "supplicant" may be used interchangeably, and "access point" and "authenticator" may be used interchangeably. Causes of the decreasing signal strength may be attributed to the client device moving farther away from the access point, or a compromised ability of the access point to broadcast signals. After the client device detects a different access point that provides better signal strength, the client device commences an association process with the different access point, a process known as roaming. Other reasons for roaming may include beacon loss, in which beacon packets from an access point are not received by the client device within a threshold period, or channel utilization, in which an excess of client devices a single access point.

Yet another reason for a client device roam may be attributed to the client device simply migrating or moving away from a particular access point. For example, in large scale deployments that have multiple wireless LAN (WLAN) clusters connected over distinct L3 subnets, migration of the client device may result in the client device moving to a different cluster corresponding to a distinct subnet. A controller such as a wireless controller may manage each of the clusters. One example is that a client device may move to different floors or different buildings. These different floors or different buildings may correspond to different subnets.

Sometimes, when a client device requests to reassociate to the new access point at the new subnet, the client device may become temporarily deauthenticated at the new access point. This deauthentication may result in latency and interruptions for the client device. The client device waits for keys to be computed and for other authentication steps such as authenticating the identification information. To reduce or minimize these latencies, one or more of the precursor keys may be proactively computed and stored, for example, at a cluster or a controller of the new access point and/or at the new access point, prior to the client device requesting to reassociate, in anticipation of such a request. Therefore, the client device does not need to wait for these keys to be computed or derived at that new access point.

However, this storage of the precursor keys is selective, and may be based on a roaming domain respective to a home cluster of the client device, in some examples. The roaming domain with respect to each home cluster and/or with respect to each client device may already be mapped and known. In other examples, alternatively or additionally, precursor keys may be stored based a likelihood or probability of the client device actually roaming to that access point, which may be determined based on a criteria of a distance, or path loss between the original access point and the new access point, and/or based on a historical frequency that the client device visits the new access point. Thus, the precursor keys may be stored at clusters to which the client device may roam, and/or clusters to which the client device has at least a threshold probability of roaming, based on the aforementioned criteria. In some examples, this criteria may be updated at particular intervals of time and/or following roams by the client device. For example, a historical frequency may change following a roam by the client device. Otherwise, if the precursor keys were stored at every access point, and for every client device, a storage and computing footprint at all the access points may be overwhelming. For example, some deployments may have over 10,000 access points.

Overall, problems associated with a client device roaming among different subnets may include a deauthentication of the client device from an original subnet prior to roaming and reauthentication at a new subnet following roaming, and a renewal of an IP address by the client device. The deauthentication and authentication process results in a latency of receiving data and interruption of service from a perspective of the client device. Meanwhile, the renewal of the IP address stems from the incompatibility between the new subnet and the original IP address which includes the original subnet. The renewal of the IP address may cause further complications and problems that potentially result in a client device not having access at the new subnet, or accessing the new subnet with incorrect or undesired access privileges. For example, the client device may either fail to renew its IP address due to communication or timing issues, or neglect to renew its IP address, and the client device may still retain its original IP address. Additionally, even if the client device successfully renews its IP address, a Dynamic Host Configuration Protocol (DHCP) server that supplies the IP addresses may consume additional computing resources to store and reserve additional IP addresses. Moreover, the DHCP server may not receive a notification immediately that the client device has successfully renewed its IP address, which prevents the original IP address from being allocated to other processes, tasks or resources.

Thus, to address the foregoing issues, examples provided herein streamlined roaming by eliminating a deauthentication and authentication process for a client device that roams among different subnets. Once a client device is authenticated at a home cluster, a computing component may determine a roaming domain of the client device, which may include clusters corresponding to subnets to which the client device has previously roamed and/or will roam with at least a threshold probability. The computing component may preemptively cache, at the clusters that belong to the roaming domain, precursor keys such as PMK-R0s and PMK-R1s, or PMKs. The precursor keys would otherwise have been generated during an authentication process at each of the clusters. Thus, as a result of the precursor keys being preemptively cached, the authentication process may be obviated, thereby preventing or mitigating a latency due to the authentication process. The computing component may further form, establish, or provision tunnels between each of the clusters and the home cluster. Via the tunnels, data traffic at the clusters within the roaming domain may be redirected back to the home cluster for processing.

By virtue of the foregoing, not only may latency resulting from an authentication process be reduced or eliminated, but the client device may also retain its original IP address corresponding to the home cluster. By retaining its original IP address, the client device would further reduce latency associated with accessing a foreign cluster (e.g., a cluster that is part of the roaming domain). Additionally, the retaining of the original IP address eliminates a need for the client device to request a new IP address, which may be unsuccessful. Moreover, because a new IP address would not be generated for the client device accessing every foreign cluster, IP addresses may be conserved for other processes. Lastly, by routing the data traffic back to the home cluster for processing, this implementation enforces proper data security and access measures of the client device.

FIG. 1A is an example illustration of an environment such as a network 100 including a computing system that streamlines a roaming process of client devices by selectively proactively caching precursor keys. The precursor keys may include Pairwise Master Key (PMK)-R1s and/or PMK-R0s, or PMKs. In a scenario of 802.11r, a PMK-R1 may be utilized in a 4-way communication between a client device (e.g., supplicant) and a network device or controller (e.g., authenticator), as will be illustrated in FIG. 2. The PMK-R1 may be derived from the PMK-R0 between the authenticator and the supplicant. The PMK-R0, in some examples, may also be derived or generated between the authenticator and the supplicant from a master session key (MSK). Alternatively, another server that has been provided the PMK-R0 may derive the PMK-R1 and transmit the PMK-R1 to a controller associated with the authenticator. The MSK may have been generated as a result of an authentication between the supplicant and the authentication server. A PMK-R1 may be unique to a particular supplicant and authenticator; a different client device attempting to authenticate to a particular supplicant may generate a unique PMK-R1. A PMK-R1 may also be negotiated or generated, by an authenticator corresponding to a network at which the supplicant is currently connected, on behalf of another authenticator to which the supplicant is seeking to roam. PMK-R1s may be exchanged, via synchronization, among different authenticators, or clusters.

The caching of the precursor keys may occur at access points, controllers, or clusters that are part of a roaming domain of a home cluster. The roaming domain may include clusters that have previously been roamed to, clusters which are most frequently roamed to, or clusters to which a probability of roaming is at least a threshold probability, in a context of the home cluster and/or a particular client device. The selective proactive caching of precursor keys differentiates from some previous implementations, and reduces or eliminates a latency of a client device having to wait for authentication upon roaming. The selective proactive caching also balances latency considerations with conserving computing power and resources associated with the storage and maintenance of the precursor keys. Therefore, rather than indiscriminately caching PMK-R1s or PMKs at the access points or clusters, the computing system selectively caches the PMK-R1s or PMKs at access points or clusters that a client device will roam to, has previously roamed to, or has at least a threshold probability of roaming to. Additionally, as a further distinction over some previous implementations, the computing system may transmit, to the clusters or controllers associated with the clusters, identification information of a client device. Given the identification information, the controllers will properly redirect data traffic according to a role or access controls of the client device, upon the client device roaming to the clusters.

Figure 1B:
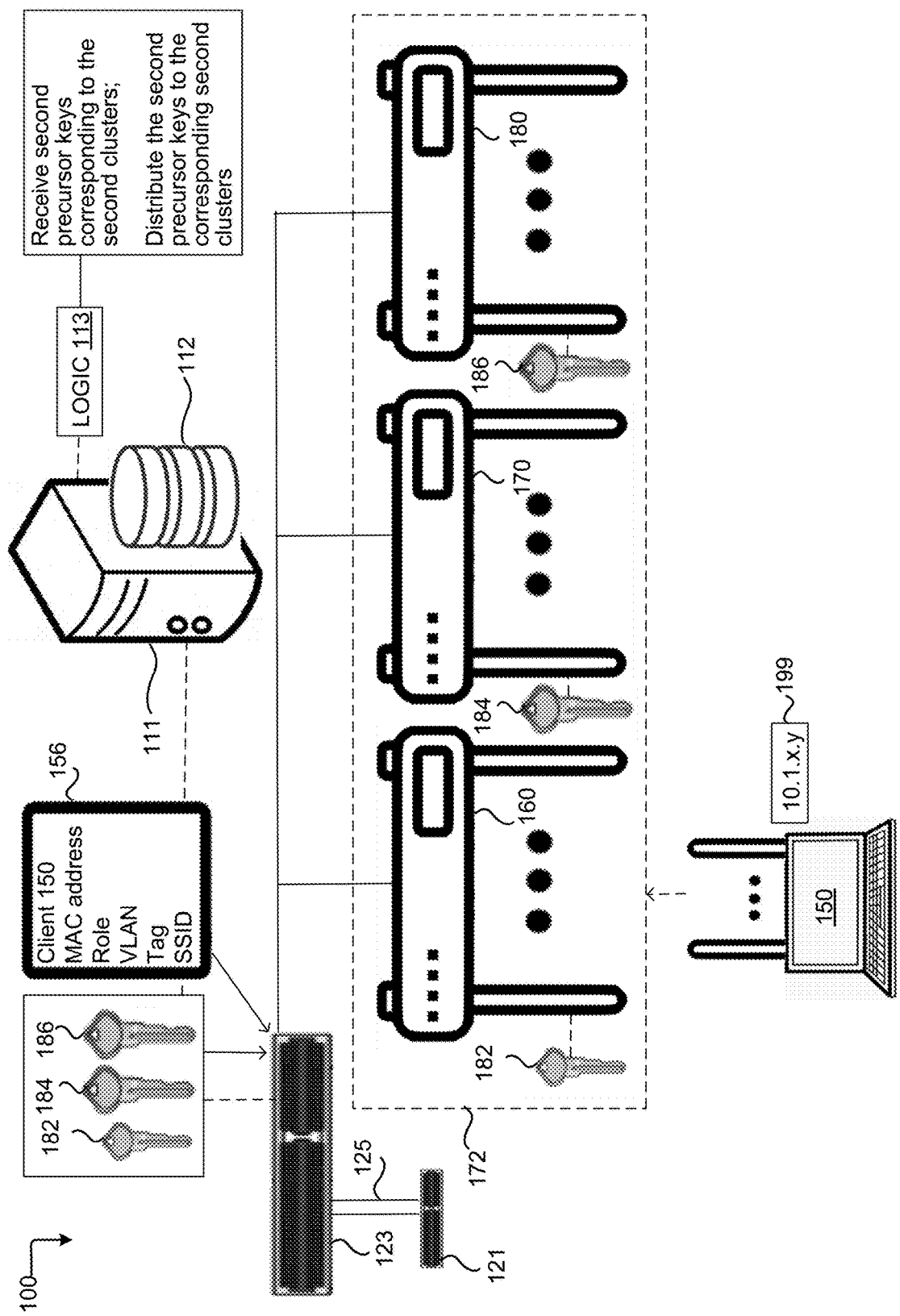
FIG. 1B is an example of a computing system that streamlines a roaming process of client devices by selectively distributing precursor keys to other clusters in order to obviate a need to authenticate the client devices at the other clusters, according to examples described in the present disclosure.
Figure 1C:
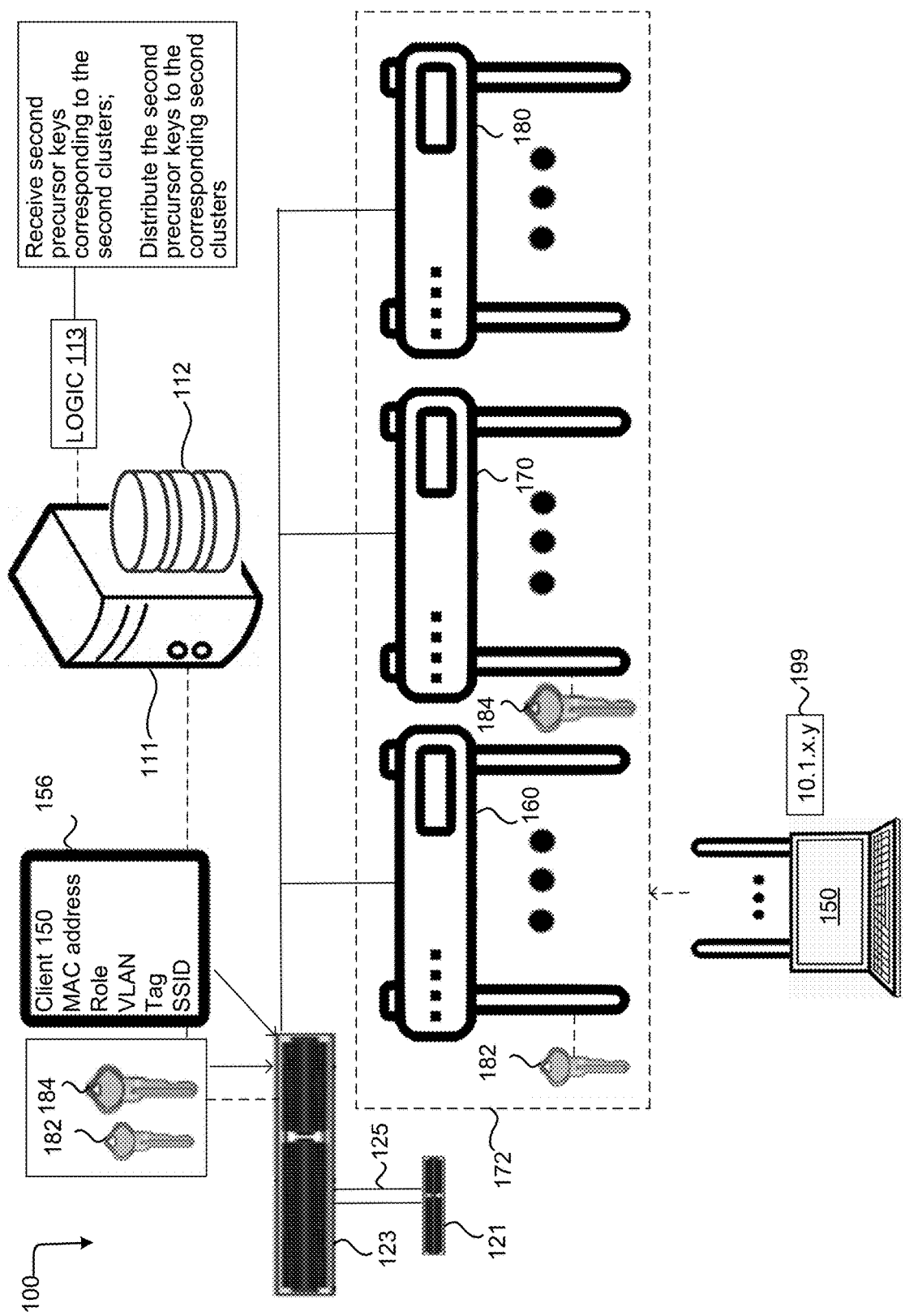
FIG. 1C is an example of a computing system that streamlines a roaming process of client devices by selectively distributing precursor keys to other clusters in order to obviate a need to authenticate the client devices at the other clusters, according to examples described in the present disclosure. The precursor keys may be selectively distributed to access points that the client devices have previously, or will roam to with at least a threshold probability.
Figure 3:
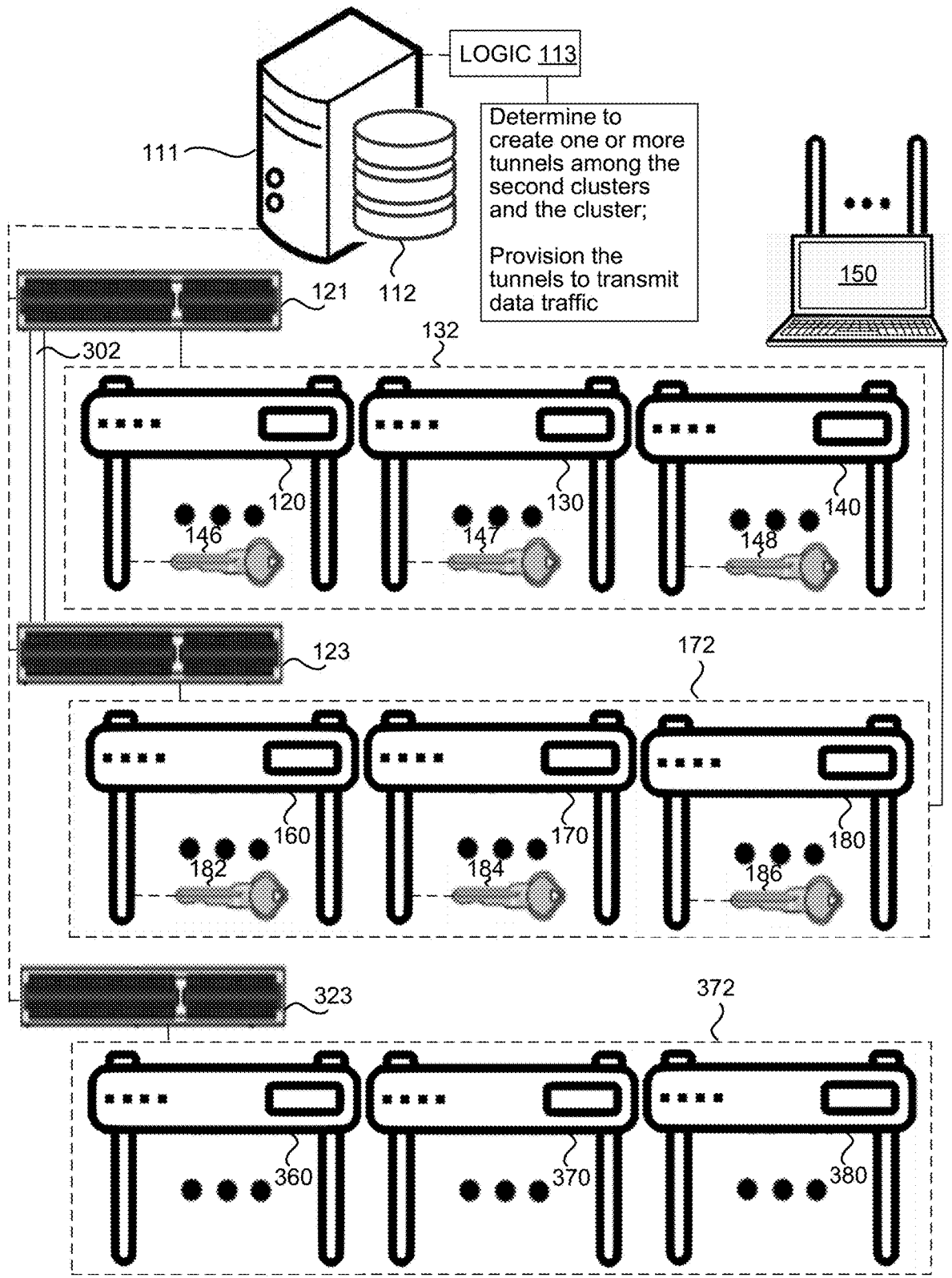
FIG. 3 illustrates an example of a formation of data traffic tunnels between roaming domains, according to examples described in the present disclosure.

In FIG. 1A, the computing system may include a computing component 111 that includes one or more hardware processors that carry out functions to control or coordinate operations at one or more clusters, such as a cluster 132, which includes access points such as access points 120, 130, and 140. In some examples, other network devices may be implemented instead of or in addition to the access points 120, 130, and 140. The access points 120, 130, and 140 may be under the control of a controller, such as a controller 121. The controller 121 may be or include, in some examples, a network controller. In a scenario in which the access points 120, 130, and 140 constitute a cluster, such as the cluster 132, the controller 121 may control the cluster 132. The cluster 132 may form its own subnet. The controller 121 may communicate, via tunnels (e.g., a tunnel 125), with controllers of other clusters, such as a controller 123 of a cluster 172 as illustrated in FIGS. 1B and 1C and/or a controller 323 of a cluster 372 as illustrated in FIG. 3. Such tunnels may include Internet Protocol Security (IPSec) tunnels. As will be further described with respect to subsequent FIGS. 1B, 1C, 2, 3, 4A, 4B, and 4C, the clusters 172 and 372 may form part of a roaming domain corresponding to the cluster 132 and/or to a client device 150.

In some examples, a router 122 and/or a switch 126 may transmit or route information or data, or otherwise communicate with, different clusters. The router 122 may be implemented as a L3 router. In some examples, the controller 121 may include a wireless local area network (WLAN) controller or an access point that manages a WLAN network, which may be applicable in relatively small WLAN networks.

The computing component 111 may include a server, such as a remote server (e.g., a cloud server) disposed separately from the network devices. As a result of the server being remote from the network devices, functions of creating user entries, managing caches of PMKs, implementing of a firewall such as a firewall 124, routing, and switching according to authentication rules and/or policies, may be at least partially offloaded from the access points or controllers of the access points, thus reducing the respective loads of the access points and the controllers. Additionally, components of the computing component 111 may be easily updated or modified at any time (e.g., in some instances, as compared to the operating system of access points), thus improving an efficiency and efficacy of the deployment.

The computing component 111 may be associated with (e.g., connected electrically and/or physically to) a database 112 that stores protocols to perform functions by the computing component 111 and data generated by the computing component 111. The data generated may include keys generated by the computing component 111, identification information of each of the client devices, roaming domains of each of the client devices or corresponding to each of the clusters, frequencies of visits to each access point or cluster by different client devices within the network 100 as identified, for example, by serial numbers of visited access points by client devices, and/or RF data, such as path losses of neighboring access points corresponding to each of the client devices. In some examples, a visit may be construed as an association of a client device to an access point. An association may include an initial association (e.g., at a home cluster or otherwise non-roaming) or an occurrence of roaming. In some examples, based on an available amount of memory, the computing component 111 may selectively delete one or more precursor keys, such as PMK-R0s, PMK-R1s, and/or PMKs, from the database 112. For example, if available memory is low, such as below a threshold amount, the computing component 111 may selectively delete keys from the database 112, based on a time at which the precursor keys were most recently utilized for roaming. Thus, older keys, which have not been utilized or accessed for roaming, may be deleted first. Such a selective deletion of keys improves upon some previous implementations by not only maintaining certain precursor keys, but also deleting expired or obsolete precursor keys to effectively utilize storage space within the database 112.

The computing component 111 may include logic 113 that incorporates or is in the form of instructions (e.g., executable by a hardware processor) to carry out the functions of the computing component 111 described herein, once a particular client device (e.g., any of client devices 150, 152, or 154)

successfully authenticates at an initial cluster or a home cluster (e.g., the cluster 132) or to any access point (e.g., the access point 120, 130, and/or 140) belonging to the initial cluster. Assume, for the sake of explanation, that the particular client device is the client device 150, which is requesting authentication at the access point 120. The computing component 111 may pass details of the initial request by the particular client device 150 to an authentication server 128, which stores credentials of and authenticates the particular client device 150. The authentication server 128 may include a Remote Authentication Dial-In User Service (RADIUS) server. In some examples, the authentication server 128 may, as a result of an interaction with the particular client device 150 or the controller 121, generate a MSK which is used to generate or derive the PMK-R0s and PMK-R1s or the PMKs.

The authentication server 128 may further identify and configure a home cluster and foreign clusters of the particular client device 150. In some examples, the home cluster may be a cluster to which each client device most frequently associates compared to other clusters, and may be part of a vendor specific attribute (VSA). Foreign clusters, meanwhile, may constitute clusters that are part of a roaming domain of the particular client device 150. The configuration of the home cluster and the foreign clusters improves upon some previous implementations by properly rerouting data traffic back to the home cluster for further processing, upon the particular client device 150 roaming to one of the foreign clusters. The foreign clusters, as a result, would be able to identify where to route data traffic back to. Otherwise, the foreign clusters may be unable to properly process the data traffic directed to the particular client device 150 due to differences between subnets of the foreign clusters and the home cluster, especially as the particular client device 150 retains its original IP address 199 and subnet, which is included within the IP address 199. The subnet corresponds to the home cluster 132. The configuration of the home cluster and the foreign clusters bolsters data security by facilitating the proper processing of data traffic, no matter where the particular client device 150 roams within the roaming domain.

The authentication server 128 may receive further identification information of the particular client device 150. The authentication server 128 may transmit the MSK, the configuration or indication of the home cluster 132, and other identification information of the particular client device 150, to the controller 121. Meanwhile, the access point 120 or the controller 121 may generate the PMK-R0s and/or PMK-R1s, or the PMKs, based on a Service Set Identifier (SSID) of a network, a mobility domain identifier (MDID), a media access control (MAC) address of the access point 120 or the controller 121, and a MAC address of the particular client device 150. In some examples, the generation of the PMK-R0s and/or the PMK-R1s, or the PMKs, may be limited to just the access point 120, to which the client device 150 is requesting authentication. In other examples, the generation of the PMK-R0s and/or the PMK-R1s, or the PMKs, may be for all access points (e.g., the access points 120, 130, and 140) within the cluster 132 and/or for access points in different clusters that belong to the roaming domain. In other words, the access point 120 or the controller 121 may negotiate PMK-R1s on behalf of a different controller (e.g., the controller 123) of a different cluster (e.g., the cluster 172).

Once the controller 121 has generated, derived, or received from the access point 120, the one or more PMK-R0s and PMK-R1s, or the PMKs, the controller 121 may transmit the PMK-R0s and PMK-R1s, or the PMKs, along with other identification information (e.g., identification information 156, 157, 158) of the particular client device 150, to the computing component 111. The controller 121 may pass the PMK-R0s and/or the PMK-R1s and the identification information to the computing component 111. The computing component 111 may store the PMK-R0s and/or the PMK-R1s, or the PMKs, and the identification information, for example, within the database 112. Storing the PMK-R0s and/or the PMK-R1s, or the PMKs, and the identification information at the computing component 111, rather than at individual controllers, may signify an advantage over some previous implementations. Such storage at the computing component 111 may facilitate the computing component 111 transmitting the precursor keys and the identification information to other clusters within the roaming domain. Thus, the computing component 111 would not need to fetch the precursor keys and the identification information from the controller 121 every time the client device 150 roams. Furthermore, the identification information, when transmitted to the other clusters, will inform the controllers associated with the other clusters how to apply policies regarding data traffic that are tailored to the client device 150, which signifies a further benefit over some preexisting solutions. Tailoring policies to the client device 150 not only secures data traffic by preventing unauthorized access of data to the client device 150, but also provides an expected level of experience to the client device 150 to avoid drastic changes in the experience to the client device 150.

In some non-802.11r scenarios, instead of both a PMK-R0 and a PMK-R1, a single PMK may be generated between the access point 120 or the controller 121 and the particular client device 150, and stored at the computing component 111. In some situations, the computing component 111 may already have the PMK-R0s and PMK-R1s, or the PMKs, corresponding to the access point 120 or the controller 121 and the particular client device 150. The identification information of the particular client device 150 may also be stored, so that the controller 121 need not generate the PMK-R0s and/or PMK-R1s, or the PMKs, or transmit the identification information to the computing component 111. Whether or not the computing component 111 already has the aforementioned keys and the identification information stored, the computing component 111 will receive, from the controller 121, an indication that the particular client device 150 has requested access at the cluster 132 or at the access point 120.

Upon the computing component 111 receiving such an indication, the computing component 111 may additionally determine, out of remaining access points or clusters besides the cluster 132 in a network, a subset of remaining clusters or access points at which authentication details of the client device 150 are to be cached. In some examples, the aforementioned subset may correspond to the roaming domain of the particular client device 150, and/or corresponding to the cluster 132 or to the access point 120 within the cluster 132. As alluded to previously, the roaming domain may already be established or known. The computing component 111 may transmit or pass, to the clusters or the access points that are within the roaming domain, identification information of the particular client device 150, including a role, a VLAN, PMK-R0s and/or PMK-R1s, or PMKs, and/or a home cluster (e.g., the cluster 132), corresponding to the client device. The identification information of the particular client device will be subsequently described in additional detail with regard to identification information 156, 157, and 158.

In some examples, additionally or alternatively, the PMK-R0s and/or PMK-R1s (in a 802.11r scenario), or the PMKs corresponding to each of the respective clusters or access points within the roaming domain, may be generated before being cached. Assume that the roaming domain of the particular client device 150, and/or corresponding to the cluster 132 or to the access point 120 within the cluster 132, may already be established or known. The PMK-R0s transmitted to the one or more clusters comprised within the roaming domain may be same or similar to the PMK-R0s stored at the controller 121.

However, in some examples, each of the PMK-R1s transmitted to different clusters and/or to each of the individual access points may be different from one another and from the PMK-R1s stored at the controller 121. Even the PMK-R1s transmitted to access points belonging to common clusters may be different from one another. These differences may be attributed to the PMK-R1s being specific and unique to each basic service set (BSS) on each access point. For this reason, new PMK-R1s may be generated, by the controller 121 or by the access point 120, corresponding to different clusters or different access points within the different clusters. In other words, the controller 121 or the access point 120 may negotiate PMK-R1s on behalf of other clusters or other access points so that if the client device 150 were to roam anywhere within the roaming domain, any access point or controller of a cluster within the roaming domain would already have the PMK-R1s stored or cached. Thus, any access point or controller of a cluster within the roaming domain would not need to generate the PMK-R1s after the client device 150 roams to that cluster or access point within the roaming domain. In some examples, the controller 121 may transmit the PMK-R1s corresponding to other clusters or access points within the roaming domain to the computing component 111, and the computing component 111 may transmit the PMK-R1s to the respective other clusters or access points. In such a manner, the other clusters or access points within the roaming domain conserve time that would otherwise be consumed by generating the PMK-R1s in an authentication process, and mitigates or eliminates a latency to the client device 150 due to the authentication process.

In some examples, the controller 121 may transmit the PMK-R1s to both the computing component 111 and to the respective other clusters or access points within the roaming domain, or to controllers associated with the respective other clusters, such as the controller 123. The above situation in which PMK-R1s are generated for different clusters or access points within the roaming domain may be relevant when the client device 150 has not previously roamed to certain clusters or access points within the roaming domain, or has not roamed to the aforementioned clusters or access points within a recent timeframe, such as within a previous eight hours or any previous duration of time. Since the PMK-R0s and/or the PMK-R1s may have a temporary storage life and may expire following a set duration, such as eight hours, the PMK-R0s and/or the PMK-R1s may be periodically regenerated. In a non-802.11r scenario, PMKs may be generated and/or cached at any access point or controller of a cluster within the roaming domain in same or similar manners as those above regarding PMK-R1s.

In some scenarios, the PMK-R1s corresponding to the respective clusters or access points within the roaming domain may already be known or cached at the computing component 111. Thus, the controller 121 or the access point 120 would not need to generate the PMK-R1s or negotiate on the behalf of the other clusters or the other access points. The computing component 111 may then transmit the PMK-R1s to the respective clusters or access points so that the PMK-R1s will be synchronized at the respective clusters or access points.

The previous description focuses on situations in which the roaming domain corresponding to a cluster (e.g., the cluster 132) or an access point (e.g., the access point 120), and/or corresponding to a client device (e.g., the client device 150) is known, or has been established or mapped. However, in some situations, the roaming domain is to be determined or updated. In some examples, the roaming domain, which may comprise or consist of a subset of the remaining clusters besides the home cluster (e.g., the cluster 132) or remaining access points besides the access point 120, to which the particular client device 150 may roam, may be determined or updated based on certain factors or criteria. For reference, the aforementioned subset may be referred to as second access points or second clusters. The second access points or second clusters may be determined based on RF neighbor data, which may encompass or indicate a group of access points, which includes the access point 120, that can detect and recognize signals from one another of at least a threshold level, such as negative 80 decibels relative to milliwatt (dBm). The second access points or second clusters may, additionally or alternatively, be determined based on factors such as path loss, a historical frequency at which the particular client device 150 roams to each respective access point or cluster, other aspects of a roaming history of the particular client device 150 at each respective access point or cluster, a duration elapsed since a most recent roaming occurrence of the particular client device 150 to each respective access point or cluster, and/or a probability that the particular client device 150 will roam to each respective access point or cluster.

The aforementioned principles generally described above will be further elaborated as applicable to multiple client devices and/or multiple access points. The computing component 111 operates within the network 100 as illustrated in FIG. 1A. The network 100 includes the access points 120, 130, and 140. The network 100 also includes client devices 150, 152, and 154. Three access points and three client devices are shown merely for illustrative purposes; any number of access points and client devices may be included in the network 100. In general, the network may include x access points and y client devices, wherein x and y are positive integers. The access points 120, 130, and 140 may include one or more 2.4 GHz radios that communicate on a 2.4 GHz band, one or more 5 GHz radios that communicate on a 5 GHz band, and/or one or more 6 GHz radios that communicate on a 6 GHz band. Communication throughout the network 100 may encompass IPv4 or IPv6 addressing.

Each of the client devices 150, 152, and 154 may connect to one or more of the access points 120, 130, and 140 in order to transmit data through the network 100. Each of the client devices 150, 152, and 154 may freely roam through the network 100. In one scenario, if the client devices 150, 152, and 154 successfully authenticate to the access point 120, as previously alluded to, the authentication server 128 may generate respective MSKs corresponding to each of the client devices 150, 152, and 154. Assuming a 802.11r scenario, the controller 121, one of the access points 120, 130, or 140, or a separate computing service or entity, may receive the MSKs, and generate PMK-R0s and/or PMK-R1s specific to the client device/access point pairs (e.g., separate PMK-R0s and PMK-R1s for each of the client devices 150, 152, 154 that associate to one of the access points 120, 130, or 140). Once the controller 121 has generated or received the PMK-R0s and/or the PMK-R1s, the controller 121 may transmit the PMK-R0s and/or the PMK-R1s to the computing component 111.

In FIG. 1A, the computing component 111 may receive PMK-R0s and/or PMK-R1s 146, 147, and 148, corresponding to respective client devices 150, 152, and 154 that have been authenticated by the authentication server 128. Thus, each of the PMK-R0 and/or PMK-R1 pairs corresponding to respective client devices is illustrated in FIG. 1A as a single key 146, 147, and 148. The computing component 111 may further receive identification information 156, 157, and 158, corresponding to the respective client devices 150, 152, and 154, from the controller 121, via Transport Layer Security (TLS) or WebSocket. The identification information 156, 157, 158, may include, for each respective client device 150, 152, and 154, a MAC address, a role (e.g., administrator, common user, engineer), a VLAN assignment, a tag corresponding to the VLAN, a SSID (Service Set Identifier) such as a BSSID (Basic Service Set Identifier) or ESSID (Extended Service Set Identifier), and a home cluster (e.g., the cluster 132). Such identification information 156, 157, and 158 may distinguish from some previous solutions, which may not link a particular role to a particular client device. Instead, in some previous solutions, a particular role may be linked to a port on a switch or other network device. Such an implementation may work if a same client device is always connected to the port, but may be ineffective in roaming scenarios. Therefore, such linkage of the particular role to the particular client device may more effectively inform both foreign clusters and home clusters (e.g., the cluster 132 corresponding to the client device 150) regarding data security, routing, tunneling, and other data processing measures upon receiving data traffic directed to the particular client device. In particular, the identification information 156, 157, and 158 may include a subnet to home cluster mapping of the client device 150. Thus, once the client device 150 roams to a foreign cluster (e.g., the cluster 172), a controller of the cluster 172 (e.g., the controller 123) may identify, from the subnet information of the IP address 199 of the client device 150, that the home cluster of the client device is the cluster 132. Therefore, the controller 123 may properly route data traffic back to the home cluster 132. The data traffic may include multicast traffic and/or unicast traffic, in some examples.

Additionally, the richness of the identification information 156, 157, and 158, provides details to the home cluster (e.g., the cluster 132) regarding not only access privileges of the particular client device, but also other parameters such as transmission speed or rate, and/or bandwidth allocated to the particular client device, and Quality of Service (QoS) markings, as will be clarified below.

In some examples, a role may be an object assigned to a respective client device based on the client device's identity. In some examples, a role may encompass an access control list (ACL). The role may contain access privileges, access levels, security enforcements, QoS markings, a Power over Ethernet (PoE) profile or priority, traffic shaping or limit attributes, captive portals, tunneling protocols or parameters, and/or other policies of, or assigned to, a respective client device. The access control lists may be stored as files and/or may be indexed. In some examples, the access control lists or policies may include particular access levels and/or access privileges to be assigned to each client device depending on a group or classification that the client device belongs to. For example, the access privileges may indicate a subset (e.g., a portion or all) of data resources, such as particular data servers, databases, platforms, objects, file directories, or files that each client device is authorized to access, particular protocols (e.g., Hypertext Transfer Protocol (HTTP) or File Transfer Protocol (FTP)) that each client device may utilize to access data resources, a transmission speed or rate to be provided to each of the client devices, one or more Vendor Specific Attributes (VSA), and/or a particular VLAN to be assigned to each client device. In some examples, the VSA may include bandwidth on incoming and/or outgoing traffic, and download and/or upload speeds. The access control lists or policies may be stored in the database 112 of the server 111, so that the server 111 may centrally update the access control lists or policies and propagate any updates to the clusters in the network.

Yet other identification information 156, 157, and 158 may include any of an onboarding or captive portal, a device fingerprint, an internet protocol (IP) address, a WMI (Windows Management Instrumentation), a device category, an Organizationally Unique Identifier (OUI), or a certificate. The identification information 156, 157, and 158 may also be stored within the authentication server 128. By assigning a role to a particular client device, rather than to a particular port on a switch, the computing component 111 may enforce or implement settings specific to the particular client device no matter which subnets the particular client device roams to. Again, the linkage of a role to a particular client device may inform all foreign clusters within a roaming domain of the particular client device regarding how data traffic is to be rerouted when the particular client device roams. Additionally, the home cluster will be informed regarding the proper access privileges of the data traffic specifically pertaining to the particular client device, so that the home cluster will properly process the data traffic to enforce the proper access privileges.

The PMK-R0s and/or PMK-R1s 146, 147, and 148, along with the identification information 156, 157, and 158, may be stored at the database 112 associated with the computing component 111. The computing component 111 may then selectively determine second clusters at which new PMK-R0s and/or PMK-R1s, which may be distinct from the PMK-R0s and/or PMK-R1s 146, 147, and 148, are to be transmitted. The identification information 156, 157, and 158 may be transmitted concurrently with the new PMK-R0s and/or PMK-R1s. In such a manner, the new PMK-R0s and/or the PMK-R1s may be preemptively cached at the second clusters to facilitate roaming to the second clusters. Additionally, the identification information 156, 157, and 158 is received by the second clusters, before a particular client device roams. In such a manner, the second clusters will be informed regarding how to route data traffic for a particular client device, even if the subnet within the IP address 199 is incompatible with a subnet of the second clusters. The second clusters may exclude the cluster 132, as previously alluded to, and may be part of a roaming domain corresponding to the access point 120, the cluster 132, and/or a particular client device (e.g., the client device 150). In some examples, the roaming domain may already be known, established, or mapped. In other examples, the roaming domain may be determined, redetermined, or updated, based on certain factors or criteria such as historical frequencies at which the client devices 150, 152, and 154 accesses each of second clusters or the access points within the second clusters, and/or path losses of each of the access points within the second clusters with respect to the cluster 132, or with respect to the access points 120, 130, and 140 within the cluster 132. In some examples, the second access points or the second clusters may be selected from among RF neighbors of the access points 120, 130, and 140, or among RF neighbors of the cluster 132, based on path losses between the access points 120, 130, and 140 and the respective RF neighbors. More particularly, the determination of the second access points based on a path loss may be based on a highest value of a path loss among all RF neighbors of the access points 120, 130, and 140, and/or a lowest value of a path loss among all RF neighbors of the access points 120, 130, and 140. Because a path loss may be related to relative location or distance between access points, this criteria takes into account relative distances between access points or clusters in assessing a likelihood or probability that a client device will roam to a particular access point or particular cluster from an initial access point or an initial cluster.

In some examples, the determination of the second clusters may, alternatively or additionally to the path loss criteria, include other RF neighbors of the access points 120, 130, and 140, that have previously been visited. Thus, the second clusters may, additionally or alternatively, include RF neighbors of the access points 120, 130, and 140 that have previously been visited. In other examples, the second clusters or the second access points may include RF neighbors of the access point 120 that have previously been visited within a threshold duration, such as during a past month, within a specified duration, such as, within the last ten days, and/or at least a threshold frequency or number of times. Thus, the determination of the second access points or the second clusters may be repeated or refreshed at periodic intervals, such as once a day, as well. The aforementioned process regarding RF neighbors and/or path loss may apply to each client device that authenticates to an access point. For example, if the client device 152 were successfully authenticated to the access point 130, the computing component 111 may determine second access points based on path loss criteria with respect to the access point 130. In particular, the list of all RF neighbors, the lowest value of path loss, and the highest value of path loss, would be determined with respect to the access point 130. Additionally, the previously visited access points or clusters would be determined specifically for the client device 152.

As alluded to above, additionally or alternatively, the computing component 111 may also determine whether or not updated or new PMK-R1s are to be generated, corresponding to and specific to the second clusters or the access points therein. In some examples, the access point (e.g., any of the access points 120, 130, or 140 to which the client devices 150, 152, and 154 associated) or the controller 121 may generate the updated or new PMK-R1s. In other examples, the PMK-R0s may be transmitted by the computing component 111 to the second clusters. The second clusters themselves, or the access points of the second clusters themselves, may compute or generate the PMK-R1s.

In some examples, if storage of the PMK-R1s at a particular access point or cluster consumes more than a threshold space, the computing component 111 may refrain from transmitting additional PMK-R1s corresponding to that access point or cluster, and/or may delete existing PMK-R1s based on a lowest frequency of usage and/or a longest duration since a most recent usage. Here, usage may be construed as a client device attempting to roam to that access point or cluster, and being authenticated using the corresponding PMK-R1 to that access point or cluster. For example, the computing component 111 may determine a time at which a most recent request from the client device to associate or reassociate to that access point or cluster occurred, determine whether a threshold period of time has elapsed since the most recent request or successful request, and in response to determining that a threshold period of time has elapsed, delete the PMK-R1.

The foregoing description preemptively caches or stores precursor keys such as PMK-R0s and/or PMK-R1s at access points and/or controllers belonging to a roaming domain of a particular client device. The preemptive caching or storing or precursor keys, when implemented with the IEEE 802.11i and 802.11r protocols, streamline roaming by obviating an entire authentication process between an authenticator (e.g., an access point or controller corresponding to a foreign cluster that is part of the roaming domain) and the supplicant (e.g., the client device 150), which would otherwise be performed if the PMK-R0s and/or PMK-R1s were not cached. The precursor keys may have a lifespan of, or last a duration of, a particular period of time such as eight hours, 24 hours, or any other period of time.

With the precursor keys already cached at the access points and/or the controllers, a simple 4-way communication may be conducted between the supplicant and the authenticator to derive encryption keys to associate or reassociate the supplicant to the authenticator. Upon completion of the 4-way communication, the supplicant may exchange encrypted data at the authenticator, thereby conserving time and processing resources otherwise consumed during a complete authentication process. This exchange of encrypted data is enabled by an opening of a virtual control port which previously was blocking traffic between the supplicant and the authenticator, which thereby permits flow of encrypted traffic. In some examples, an authentication server, such as a RADIUS server, may process authentication requests from the supplicant or from the authenticator, or alternatively, transmit the authentication requests to a separate authentication system or device, such as a domain controller. However, the authentication server may not actually participate in the 4-way communication, and/or the generation of keys.

During the 4-way communication, a PMK-R1, which is derived from a PMK-R0, may be used to derive or establish transient encryption keys, including a Pairwise Transient Key (PTK) and a Group Transient Key (GTK). The authenticator may cache the PMK-R1. The PTK may be derived, at both the authenticator and the supplicant, using a pseudo-random function (PRF), the PMK-R1, an authenticator nonce, a supplicant nonce, a media access control (MAC) address of the authenticator, and a MAC address of the supplicant. Once the supplicant receives the authenticator nonce from the authenticator, the supplicant may generate the PTK. Next, the supplicant may transmit its nonce to the authenticator in order for the authenticator to generate a matching PTK. The authenticator may then generate the GTK. The authenticator may transmit the GTK to the supplicant. During the transmission, the GTK may be encrypted using the PTK. The PTK may be used to encrypt unicast frames specifically between the supplicant and the authenticator, while the GTK may be used to encrypt multicast or broadcast frames among the authenticator and multiple supplicants. In other words, the GTK may be shared among all client devices associated with a single access point. This procedure will be elucidated in FIG. 2.

Therefore, if the authenticator or the cluster already has the PMK-R0 and/or the PMK-R1 stored or cached, the authenticator or the cluster would also save time that would otherwise be consumed by undergoing reauthentication, or deriving the PMK-R1, which would reduce delays for the client device (e.g., supplicant) that was requesting access. This storage or caching of the PMK-R0 and/or the PMK-R1 may stem from the aforementioned synchronization of PMK-R1s. In some examples, the PMK-R0 and/or PMK-R1 may be synchronized among all clusters within a roaming domain of the client device, or to which the client device has a threshold probability of roaming. Additionally, the client device may retain its original Internet Protocol (IP) address obtained from its home cluster. In some previous solutions, the reauthentication of the client device entails changing the IP address of the client device. Although the foregoing focuses on a 802.11r scenario in which PMK-R0s and PMK-R1s constitute separate keys, the description may also be applicable to a non-802.11r scenario in which a PMK is cached and synchronized instead of a PMK-R1 and/or a PMK-R0.

During the synchronization, the authenticator, or a service associated with the authenticator, may compute PMK-R1s or PMKs for each cluster within the roaming domain, and/or for each cluster to which the client device has a threshold probability of roaming. The authenticator may transmit encoded messages, such as protobuf encoded messages, to the clusters within the roaming domain and/or the access points within such clusters. The storage or caching of the PMK-R1 may extend for up to a threshold duration, such as eight hours. Additionally, the supplicant may also store or cache the corresponding PMK-R1s or PMKs once received. As a result, interruptions or disturbances of features, especially in applications such as data transmission, video, and voice, may be prevented or reduced for the supplicant.

However, as previously alluded to, storing PMK-R1s or PMKs in all the clusters, even at those not part of the roaming domain, or in which roaming has not occurred or is unlikely (e.g., below a threshold probability) results in potential shortcomings such as computing costs, bandwidth, and memory consumption. Having to store or cache PMK-R1s or PMKs at each cluster, controller, and/or access point, may result in an overwhelming growth of tunnels, and excessive processing power required to generate cryptographic keys. Additionally, the increased sizes of cache tables on access points, clusters, and/or controllers in such dense environments would consume additional memory, thereby further limiting an amount of memory available to store PMK-R1s or PMKs. If available memory associated with the clusters, access points or controllers becomes limited, either due to cache table sizes or storage consumed by existing PMK-R1s or PMKs, then further attempts to synchronize additional PMK-R1s or PMKs to the clusters, access points or controllers may be unsuccessful. If additional PMK-R1s or PMKs are not synchronized or cached at access points or clusters that are part of the roaming domain, the client devices associated with the additional PMK-R1s or PMKs would likely experience additional latency and compromised quality of service during roaming. Media Access Control (MAC) randomization may further increase a storage footprint of the PMK-R1s because for each unique Service Set Identifier (SSID), a client device may use a different, randomized MAC address, and for each MAC address, the authenticator may generate a new PMK-R1 or PMK. Therefore, a selective caching of PMK-R1s or PMKs at clusters, access points or controllers would address the aforementioned shortcomings, while still maintaining a streamlined roaming process.

Although the foregoing focuses on a 802.11r scenario, the principles described above in relation to FIG. 1A may be applicable to a non-802.11r scenario, in which a single PMK key is implemented instead of two separate keys, a PMK-R0 and a PMK-R1.

In FIG. 1B, the computing component 111 may receive PMK-R1s 182, 184, and 186 corresponding to access points 160, 170, and 180, which are part of a cluster 172. The cluster 172 may constitute a second cluster, and be part of the roaming domain of the cluster 132, and/or of the client device 150, in FIG. 1A. The PMK-R1s 182, 184, and 186 may have been generated by the access point 120 or the controller 121. In other words, the access point 120 or the controller 121 may have negotiated the PMK-R1s 182, 184, and 186 on behalf of the controller 123, or on behalf of the access points 160, 170, and 180. The computing component 111 may transmit or distribute the PMK-R1s 182, 184, and 186 to a controller 123 of the access points 160, 170, and 180. The computing component 111 may transmit or distribute the identification information 156 corresponding to the client device 150. The computing component 111 may transmit or distribute corresponding PMK-R1s to other controllers corresponding to clusters that are part of the roaming domain. Therefore, if and when the client device 150 roams to the cluster 172, or any of the access points 160, 170, and 180 within the cluster 172, the client device 150 may perform a four-way handshake with the controller 123, or with any of the access points 160, 170, and 180, without needing to wait for authentication or generation of the PMK-R1s 182, 184, and 186. The client device 150, upon roaming, may retain the original IP address 199 without changing the original IP address from association at the home cluster 132. Additionally, the controller 123 may further, from the identification information 156, recognize what actions to perform regarding any data traffic, such as formatting or processing, destined for the client device 150. Because the identification information 156 may indicate that the home cluster of the client device 150 is the cluster 132, the cluster 172 would be a foreign cluster. Thus, the controller 123 of the cluster 172 may determine that any traffic destined for the client device 150 is to be diverted or directed towards the cluster 132, under a protocol or definition of a foreign cluster that is stored within the computing component 111. The aforementioned signifies an improvement over some existing techniques because the client device 150 may forego the renewal of the original IP address 199. Avoiding the renewal of an IP address may confer benefits both to the client device 150 and to the computing environment 100. In particular, the client device 150 may save time and avoid a potential risk of interruption due to unsuccessfully renewing an IP address. Meanwhile, a DHCP server needs not generate an additional IP address or reserve the additional IP address for the client device 150.

The cluster 172 may belong to a different subnet compared to the cluster 132. The cluster 172 may also correspond to or belong to a different VLAN compared to the cluster 132. Even if the cluster 172 belongs to a same VLAN as the cluster 132, rules and policies of the cluster 132 may not be extended, or applicable, to the cluster 172. In particular, policies regarding data access, processing, and/or transmission may not carry over between the cluster 132 and the cluster 172. As a particular example, the cluster 132 may be designated for, and have policies specific to, common users. Meanwhile, the cluster 172 may be designated for, and have policies specific to, privileged users, such as administrators. Thus, the cluster 172 may have fewer restrictions regarding data access privileges compared to the cluster 132. For instance, data that might be redacted or hidden in the cluster 132 may be visible in the cluster 172. Because the client device 150 belongs to the cluster 132 as its home cluster, and the client device 150 retains the original IP address 199 from the home cluster 132, the client device 150 has restrictions on data access and/or data processing specific to the home cluster (e.g., the cluster 132). Once the client device 150 roams to the cluster 172, the client device 150 has a same identity as before, and should not experience elevated data access privileges, but should still retain its same rules and policies from the cluster 132. The controller 123 may be unaware of and/or unable to process data according to policies or restrictions of the cluster 132. Thus, in some implementations, the controller 123 of the cluster 172 may divert data traffic back to the cluster 132, due to an inability of the controller 123 to handle policies or rules specific to or associated with another cluster. In such a manner, data security may be applied to be specific to or associated with a role of the client device 150, or any client device, no matter the particular rules, policies, settings, protocols, or privileges of a cluster to which the client device 150 roams.

FIG. 1B illustrates a scenario in which PMK-R1s are generated for all access points of a second cluster (e.g., the cluster 172 within the roaming domain of the cluster 132, and/or of the client device 150), or in which all access points within the second cluster 172 are determined to be part of the roaming domain. Although the foregoing focuses on a 802.11r scenario, the principles described above in relation to FIG. 1B may be applicable to a non-802.11r scenario, in which a single PMK key is implemented instead of two separate keys, a PMK-R0 and a PMK-R1.

However, in some other scenarios, even if a second cluster is part of a roaming domain, some access points within that second cluster may not be part of the roaming domain. In other words, the client device 150 may associate to certain access points of that second cluster upon roaming to that second cluster and avoid associating, or not associate, at other clusters. As illustrated in FIG. 1C, in such scenarios, the computing component 111 may selectively transmit PMK-R1s (e.g., the PMK-R1s 182 and 184) corresponding to access points of the second cluster (e.g., the access points 160 and 170 of the cluster 172) to which the client device 150 may associate. For example, the client device 150 may not associate to the access point 180 during roaming but may associate to the access points 160 and 170 of the cluster 172. Either the controller 121 or the access point 120 of FIG. 1A may refrain from generating a PMK-R1 corresponding to the access point 180, or the computing component 111 may refrain from transmitting or distributing a PMK-R1 corresponding to the access point 180. Thus, in FIG. 1C, precursor keys such as PMK-R1s may not be synchronized at access points which are not roamed to by the client device 150, even if that access point is part of a cluster that is comprised within the roaming domain. By selectively synchronizing PMK-R1s corresponding to particular access points, the computing component 111 may conserve storage and computing resources. Although the foregoing focuses on a 802.11r scenario, the principles described above in relation to FIG. 1C may be applicable to a non-802.11r scenario, in which a single PMK key is implemented instead of two separate keys, a PMK-R0 and a PMK-R1.

FIG. 2 illustrates an example of a four-way handshake between a client device and an access point or a controller to generate additional keys that facilitate the transmission of encrypted data between an access point and a client device. FIG. 2 illustrates operations that may occur following those illustrated in FIGS. 1B and 1C. In FIG. 2, assume that the client device 150 roams to the access point 160, which is part of the cluster 172. Following association of the client device 150 to the access point 160, the access point 160 and/or the controller 123 may already have preliminarily cached the PMK-R1 182, from FIG. 1B or 1C. The PMK-R1 182 may be used to generate additional keys, between the client device 150 and the access point 160 or the controller 123, to securely transmit and exchange encrypted data packets. Therefore, by already caching the PMK-R1 182 the access point 160 and/or the controller 123, the generation of additional keys may be faster.

The access point 160 or the controller 123 may transmit a nonce to the client device 150 in order for the client device to independently generate a transient key (e.g., a Pairwise Transient Key (PTK)). The access point 160 or the controller 123 may receive a second nonce from the client device and generate the transient key based in part on the nonce and the second nonce. Therefore, once the access point 160 or the controller 123 processes a data packet, the access point 160 or the controller 123 encrypts the data packet using the transient key, and transmits the data packet to the client device 150, as will be described in additional detail below.

In FIG. 2, the access point 160, or the controller 123, may store the PMK-R1 182, as received from the computing component 111, from FIG. 1B or 1C. The controller 123 or the access point 160 may transmit the PMK-R1 182 to the client device 150. The controller 123 or the access point 160 may also transmit a nonce 260 to the client device 150. The client device 150 may generate a PTK 294 using the nonce 260, a second nonce 270 generated by the client device 150, a MAC address of the client device 150, and a MAC address of the access point 160, which the client device 150 already knows. The generation of the PTK 294 may involve a Pseudorandom Function (PRF).

Once the client device 150 generates the PTK 294, the client device 150 transmits the second nonce 270 to the controller 123 or the access point 160. The client device 150 may also transmit a message integrity check (MIC) 272 which may include a cryptographic hash to confirm a veracity of the PTK 294 that will be generated by the controller 123 or the access point 160. The MIC 272 may have been generated using at least a portion of the PTK 294.

The controller 123 or the access point 160 generates the PTK 294 using the nonce 260, the second nonce 270 generated by the client device 150, the MAC address of the client device 150, and the MAC address of the access point 160. The access point 160 or the controller 123 generates a MIC, using at least a portion of the PTK 294. The access point 160 or the controller 123 verifies whether the MIC generated matches the MIC 272. If so, the access point 160 or the controller 123 authenticates the client device 150. The access point 160 or the controller 123 then generates a Group Temporal Key (GTK) 296 and transmits the GTK 296 and the generated MIC (identical to the MIC 272) to the client device 150. The client device 150 provides a final acknowledgement 274. As a result, the client device 150 and the access point 160 or the controller 123 are now equipped with all keys to securely transmit and exchange encrypted data packets.

FIG. 3 illustrates a formation of data traffic tunnels between roaming domains. As described with respect to FIG. 1B, the cluster 172 may be at least part of a roaming domain corresponding to the cluster 132 and/or the client device 150. However, some clusters, such as a cluster 372, may not be included as part of a roaming domain corresponding to the cluster 132 and/or the client device 150. The cluster 372 may include access points 360, 370, and 380, and may be controlled by a network controller 323.

The computing component 111 may selectively form data traffic tunnels among or between any clusters that are part of a common roaming domain. Thus, because the cluster 172 is part of a roaming domain corresponding to the cluster 132 and/or the client device 150, the computing component 111 may provision or form a data traffic tunnel 302 between the cluster 132 and the cluster 172. The data traffic tunnel 302 may be distinct from the tunnel 125 illustrated in FIGS. 1A and 1B. The data traffic tunnel 302 may include a Generic Routing Encapsulation (GRE) and/or an Internet Protocol Security (IPSec) tunnel. In particular, the data traffic tunnel 302 may route data traffic from the controller 123 back to the controller 121 because, as explained previously, the cluster 172 may be a foreign cluster (e.g., a non-home cluster) with respect to the client device 150, and the controller 123 may be programmed or configured to route any data traffic back to a home cluster of a roaming client device, in situations that the cluster 172 is a foreign cluster. The controller 123 may recognize which controller to route the data traffic based on a mapping between a subnet of the client device 150 and the cluster 132. The subnet may be present in the identification information 156, and/or the original IP address 199, and be received by the controller 123, as mentioned with regard to FIG. 1A. In other words, each controller may have information regarding a mapping between subnets and home clusters that the subnets belong to.

Otherwise, the controller 123 may be unable to implement rules or policies, for example, of data access, processing, formatting, or transmission, as associated with rules or policies corresponding to the client device 150, because the client device 150 retains its previous IP address from the home cluster 132, which has different rules or policies from the cluster 172. Following the diverting or transmission of data traffic back to the controller 121 via the data traffic tunnel 302, the controller 121 may process the data traffic and transmit the processed data traffic back to the controller 123, so that the data traffic may be accessed by the client device 150. The computing component 111 may refrain from or skip the formation of a tunnel between the cluster 172 and the cluster 372, because the cluster 372 is not part of a roaming domain corresponding to the cluster 132 or to the cluster 172.

Such selective formation of data traffic tunnels signifies an improvement over some existing techniques because the data traffic tunnels route data traffic from a foreign cluster back to a home cluster which may properly process the data traffic. The foreign cluster may be otherwise unable to properly process the data traffic because the foreign cluster is unaware of particular policies associated with a roaming client device, and/or of a subnet of the roaming client device. Thus, without the data traffic tunnels, the roaming client device may be either unable to receive data traffic at the foreign cluster, experience delays in receiving such data traffic, and/or receive data traffic that fails to match the specific policies for the roaming client device.

Figure 4A:
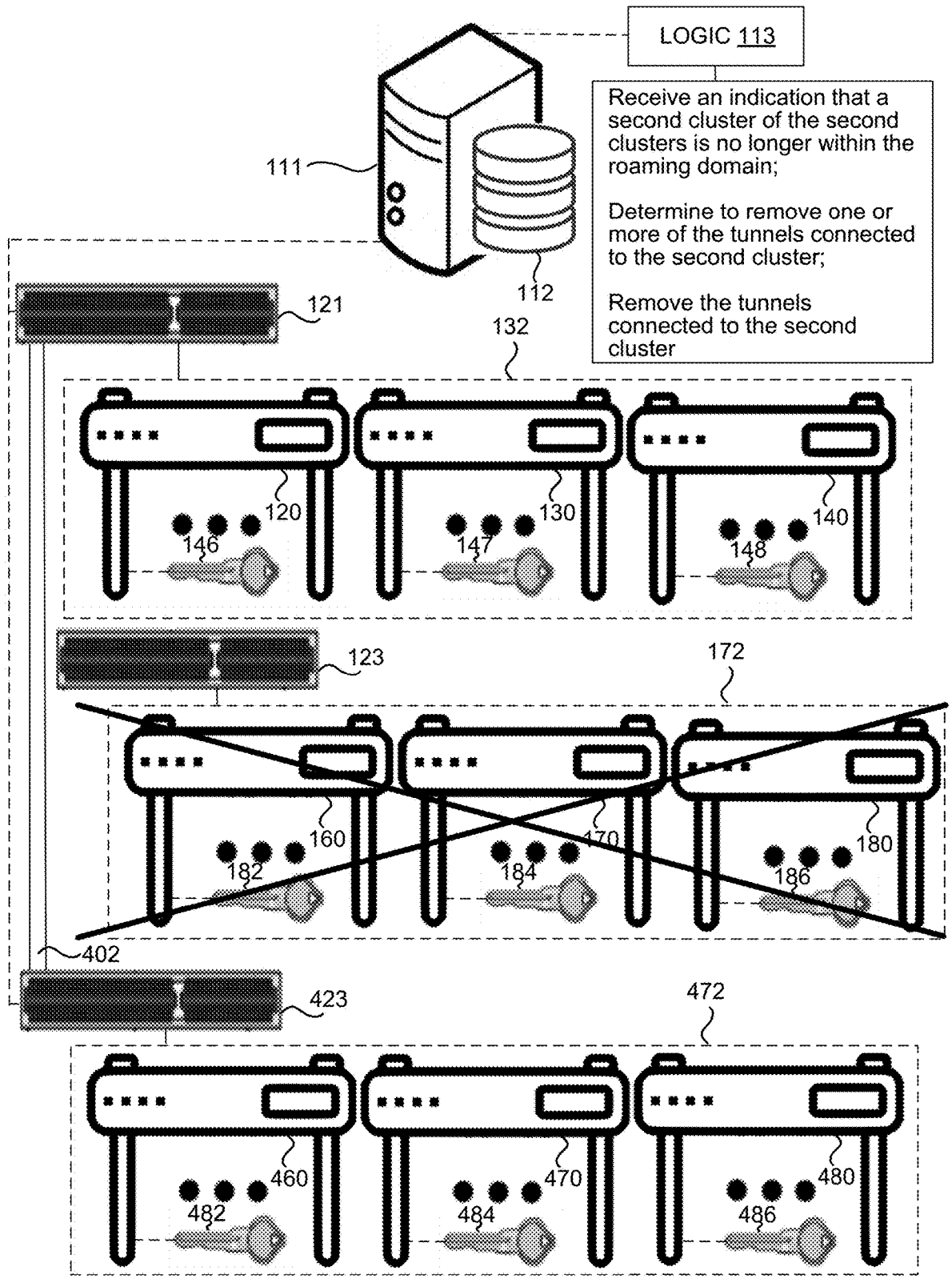
FIG. 4A illustrates an example of a formation of data traffic tunnels between roaming domains following an addition of new clusters and/or a removal of existing clusters, according to examples described in the present disclosure.

In some examples, new clusters may be added and/or existing clusters may be removed. The computing component 111 may adaptively modify a topology of data traffic tunnels in response to such additions or removals. This represents a further improvement over some existing implementations because it adapts to changing conditions among subnets. As illustrated in FIG. 4A, the computing component 111 may receive an indication that a new cluster 472 is now part of the roaming domain corresponding to the cluster 132, and/or that the cluster 172 is no longer part of the roaming domain corresponding to the cluster 132. The new cluster may include access points 460, 470, and 480, and be controlled by a controller 423. PMK-R1s 482, 484, and 486, corresponding to the respective access points 460, 470, and 480, may be distributed to the controller 423. PMK-R1s for each different client device may additionally be separately generated. For example, if the client device 152 (e.g., from FIG. 1A) also belonged to the cluster 132 as its home cluster, and has a roaming domain that includes the cluster 472, separate PMK-R1s that are different from the PMK-R1s 482, 484, and 486 may also be generated for the client device 152. The computing component 111 may remove the data traffic tunnel 302 from FIG. 3. As a result of removing the data traffic tunnel 302, the computing component 111 may conserve computing resources associated with maintenance of the data traffic tunnel 302, which is no longer used due to the cluster either going down or not being part of the roaming domain. This selective removal of data traffic tunnels that are no longer used distinguishes over some previous implementations, which may not selectively form data traffic tunnels in the first place, let alone, adaptively remove data traffic tunnels. Meanwhile, the computing component 111 may provision a data traffic tunnel 402 between the controller 121 and the controller 423, in a same or similar manner as the data traffic tunnel 302 described with respect to FIG. 3. The computing component 111 may monitor a transmission of data traffic between the second controllers and the controller to verify proper routing and/or rerouting of the data traffic and/or to detect anomalous patterns of transmission.

Figure 4B:
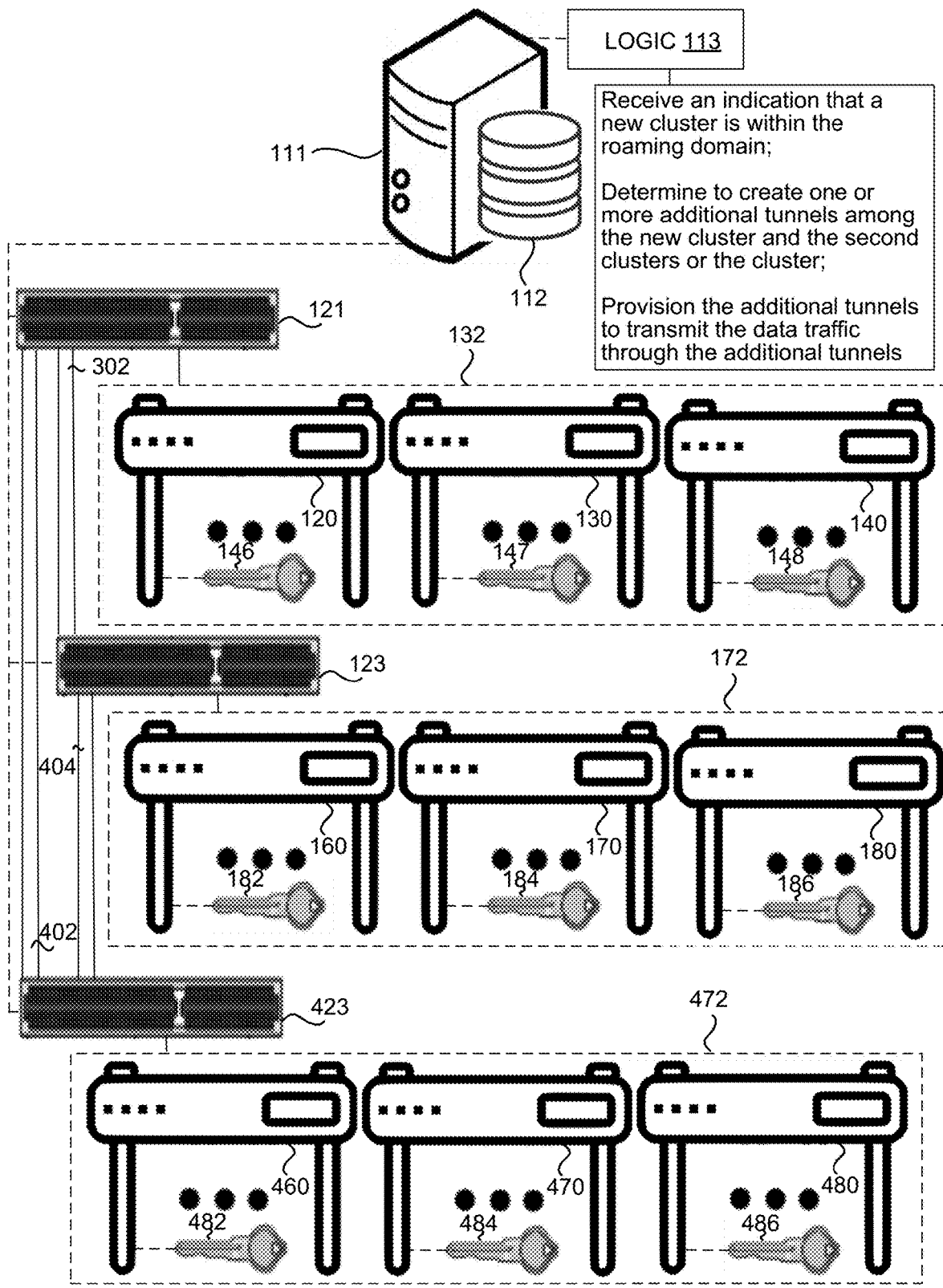
FIG. 4B illustrates an example of a formation of data traffic tunnels between roaming domains following an addition of new clusters, according to examples described in the present disclosure.

Meanwhile, in FIG. 4B, the new cluster 472 is part of the roaming domain corresponding to the cluster 132, and the cluster 172 still remains part of the roaming domain corresponding to the cluster 132 as distinguished from the scenario illustrated in FIG. 4A. The computing component 111 may provision a formation of the data traffic tunnel 404, in addition to the data traffic tunnels 402 and 302. Thus, the computing component 111 may provision data traffic tunnels among each of the clusters within a roaming domain. The data traffic tunnels formed among each of the clusters within a roaming domain may be connected in a full mesh topology in a scenario which all three of the clusters 132, 172 and 472 belong to a common roaming domain. In addition, PMK-R1s for each different client device may additionally be separately generated. For example, if the client device 152 belonged to the cluster 172 as its home cluster, and has a roaming domain that includes the cluster 472, separate PMK-R1s that are different from the PMK-R1s 482, 484, and 486 may also be generated for the client device 152. Also, if the client device 152 has a roaming domain that includes the cluster 132, separate PMK-R1s different from the PMK-R1s 146, 147, and 148 may be generated for the client device 152.

Figure 4C:
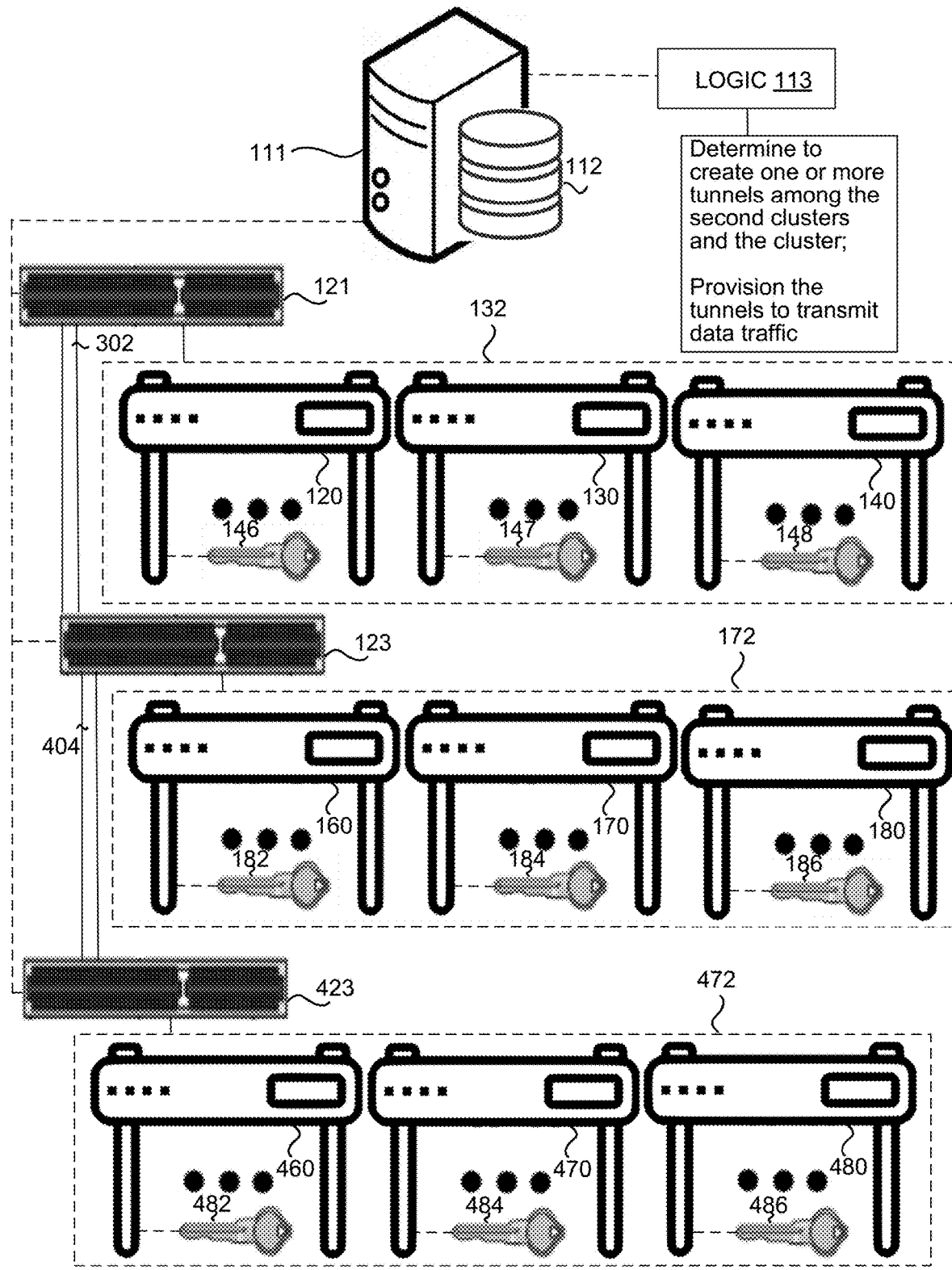
FIG. 4C illustrates an example of a formation of data traffic tunnels between roaming domains in which roaming domains among clusters and/or client devices are not in common among the roaming domains, according to examples described in the present disclosure.

Additionally, FIG. 4C illustrates an alternative to FIG. 4B, in which the cluster 172 may be part of the roaming domain (e.g., a first roaming domain) corresponding to the cluster 132 and/or to the client device 150 but the cluster 472 is not part of, or does not belong to, the first roaming domain corresponding to the cluster 132 and/or to the client device 150. In such a scenario, the computing component 111 may determine to form the tunnel 302 from the cluster 132 to the cluster 172, but not a tunnel from the cluster 132 to the cluster 472. Moreover, the cluster 472 may be part of the roaming domain (e.g., a second roaming domain) corresponding to the cluster 172 and/or to the client device 152 (assuming that the home cluster corresponding to the client device 152 is the cluster 172). However, the cluster 132 may not be part of, or does not belong to, the second roaming domain corresponding to the cluster 172 and/or to the client device 152. In such a scenario, the computing component 111 may determine to form the tunnel 404 from the cluster 172 to the cluster 472, but neither the tunnel 402 from the cluster 132 to the cluster 472, nor a reverse tunnel from the cluster 472 to the cluster 132 or any tunnel between the cluster 132 and the cluster 472. In such a scenario illustrated in FIG. 4C, the tunnels 302 and 402 among the clusters 132, 172, and 472 may not form a full mesh topology, due to the respective roaming domains corresponding to different clusters and/or client devices not being in common. Therefore, based on the home cluster of a particular client device, and/or based on a current cluster where the particular client device is currently present, formation of tunnels and generation of keys (e.g., PMK-R0s and/or PMK-R1s, or PMKs) may be programmed and determined accordingly. In such a manner, data traffic tunnels may be selectively formed depending on roaming characteristics of individual client devices, so that computing resources are not squandered on formation and maintenance of unused data traffic tunnels. The above description regarding FIGS. 4A-4C focus on a 802.11r scenario, but a non-802.11r scenario that implements PMKs instead of PMK-R1s is also applicable.

Figure 5A:
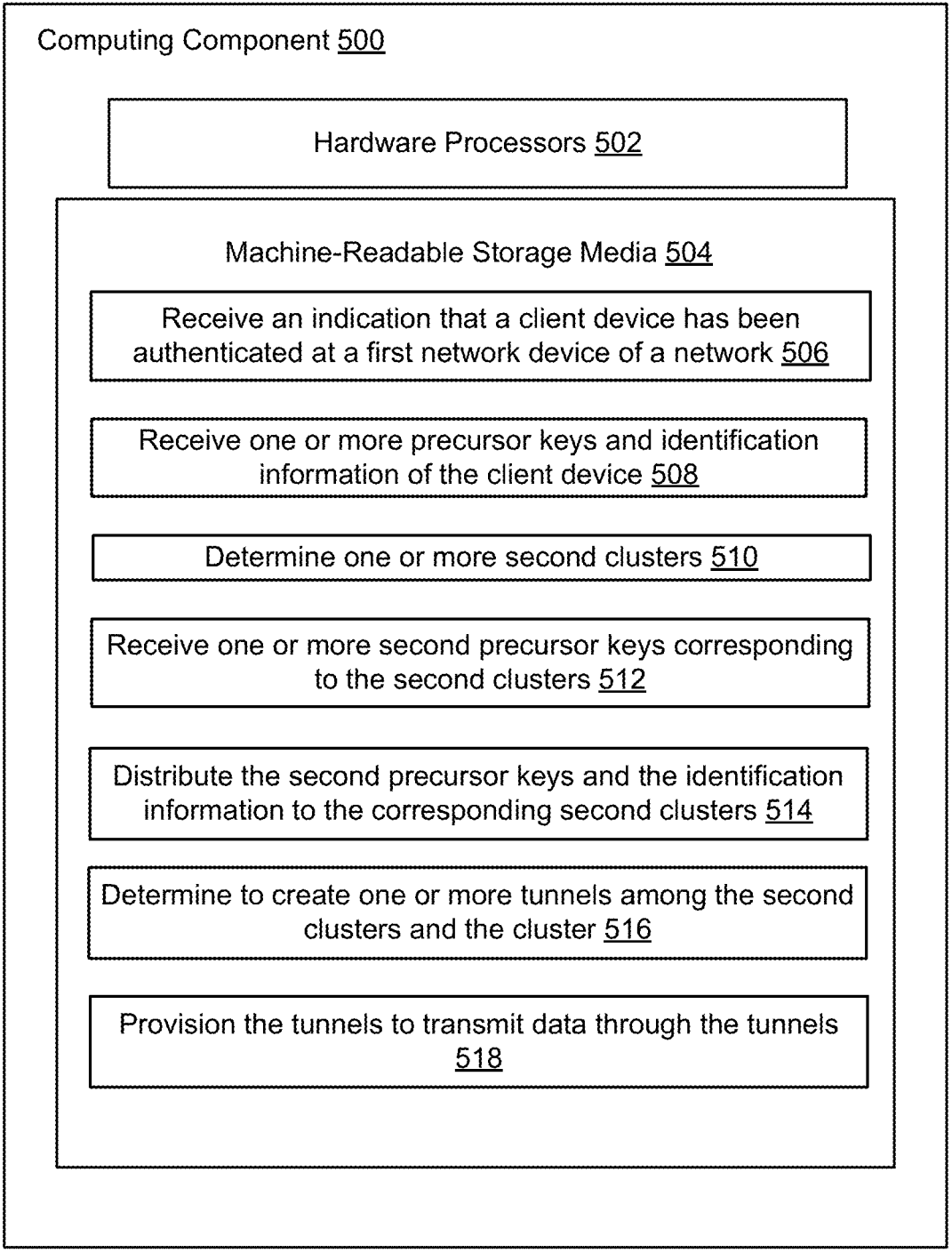
FIG. 5A is an example illustration depicting how a computing component that streamlines a roaming process of client devices among different clusters or subnets, according to examples described in the present disclosure.

FIG. 5A illustrates a computing component 500 that includes one or more hardware processors 502 and machine-readable storage media 504 storing a set of machine-readable/machine-executable instructions 506-518 that, when executed, cause the hardware processor(s) 502 to orchestrate a seamless roaming operation, which involves streamlining roaming of client devices across subnets, while the client device still retains its original IP address that was generated from authentication at a base cluster, or home cluster. It should be appreciated that there can be additional, fewer, or alternative steps performed in similar or alternative orders, or in parallel, within the scope of the various embodiments discussed herein unless otherwise stated. In some examples, the computing component 500 may be implemented as the computing component 111 of FIGS. 1A, 1B, 1C, 2, 3, 4A, and/or 4B. The computing component 500 may include a server. In some examples, the instructions 506-518 may serve as or form part of logic 113 of the computing component 111.

The hardware processor(s) 502 may execute instruction 506 to receive an indication that a client device (e.g., the client device 150 of FIGS. 1A, 1B, 1C, 2, 3, 4A, and/or 4B) has been authenticated at a first network device (e.g., the access point 120 of FIG. 1A, 1B, or 1C) of a network, such as the network 100 of FIG. 1A, 1B, or 1C. The authentication may be in response to an initial request from the client device 150 to access a network via the access point 120, as illustrated in FIG. 1A. The access point 120 may belong to the cluster 132, which corresponds to a first L3 subnet. Each separate cluster 132 may correspond to a distinct L3 subnet. At each L3 subnet, a controller such as a network controller may implement different protocols or policies, such as those pertaining to data access privileges, data processing or formatting procedures.

The hardware processor(s) 502 may execute instruction 508 to receive one or more precursor keys (e.g., PMK-R1s and/or PMK-R0s, or PMKs 146) and identification information (e.g., the identification information 156) of the client device 150. The precursor keys may include PMK-R1s and/or PMK-R0s in a 802.11r scenario, and PMKs in a non-802.11r scenario. The precursor keys may have been generated from the authentication of the client device 150 at the access point 120. The identification information 156 may include, as alluded to with regard to FIG. 1A, a MAC address, a role (e.g., administrator, common user, engineer), a VLAN assignment, a tag corresponding to the VLAN, a SSID (Service Set Identifier) such as a BSSID (Basic Service Set Identifier) or ESSID (Extended Service Set Identifier), and a home cluster (e.g., the cluster 132). In some examples, a role may be an object assigned to a respective client device based on the client device's identity. In some examples, a role may encompass an access control list (ACL). The role may contain access privileges, access levels, security enforcements, Quality of Service (QoS) markings, a Power over Ethernet (PoE) profile or priority, traffic shaping or limit attributes, captive portals, tunneling protocols or parameters, and/or other policies of, or assigned to, a respective client device. The access control lists may be stored as files and/or may be indexed. In some examples, the access control lists or policies may include particular access levels and/or access privileges to be assigned to each client device depending on a group or classification that the client device belongs to. For example, the access privileges may indicate a subset (e.g., a portion or all) of data resources, such as particular data servers, databases, platforms, objects, file directories, or files that each client device is authorized to access, particular protocols (e.g., Hypertext Transfer Protocol (HTTP) or File Transfer Protocol (FTP)) that each client device may utilize to access data resources, a transmission speed or rate to be provided to each of the client devices, one or more Vendor Specific Attributes (VSA), and/or a particular VLAN to be assigned to each client device. In some examples, the VSA may include bandwidth on incoming and/or outgoing traffic, and download and/or upload speeds.

The hardware processor(s) 502 may execute instruction 510 to determine one or more second clusters. The second clusters may include remaining clusters, besides the cluster, that are within a roaming domain of the cluster or the client device. In some examples, as alluded to with regard to FIG. 1A, the roaming domain of a cluster may be known. In other examples, additionally or alternatively, the roaming domain of a cluster may be updated or determined based on certain criteria such as respective path losses from the access point 120 to each of remaining access points on the remaining clusters and/or respective historical frequencies at which the client device 150 associates at the respective remaining access points. As mentioned previously with reference to instructions 506, each of the second clusters may correspond to a different L3 subnet.

The hardware processor(s) 502 may execute instruction 512 to receive one or more second precursor keys corresponding to the second clusters. For example, as illustrated in FIG. 1B, the second precursor keys may include PMK-R1s 182, 184, and 186 corresponding to the cluster 172, in particular, corresponding to the respective access points 160, 170, and 180 of the cluster 172. The PMK-R1s 182, 184, and 186 may have been generated, for example, by the controller 121 or the access point 120 in FIG. 1A. In some examples, the second precursor keys may be distinguished from the precursor keys referred to in instruction 508. In some examples, the second precursor keys may be limited to particular access points within the second clusters. In particular, if the client device 150 has not, or will be unlikely to roam to (e.g., below a threshold probability) a particular access point, such as the access point 180, on the cluster 172, as illustrated in FIG. 1C, then the second precursor keys would exclude a PMK-R1 for the access point 180. Using the second precursor keys, the client device 150 may perform a handshake without needing to reauthenticate or renew an IP address, at any of the access points 160, 170, or 180 (if a PMK-R1 exists at the access point 180, in the scenario of FIG. 1B). The handshake is illustrated in FIG. 2.

The hardware processor(s) 502 may execute instruction 514 to distribute the second precursor keys and/or the identification information to the corresponding second clusters. For example, as illustrated in FIG. 1B, the hardware processor(s) 502 may distribute the PMK-R1s 182, 184, and 186 to the cluster 172, which may distribute the PMK-R1s 182, 184, and 186 to the access points 160, 170, and 180, respectively. Additionally, with the identification information, controllers corresponding to foreign clusters, such as the cluster 172, may determine proper data routing procedures of data traffic that is directed to each client device, such as the client device 150.

The hardware processor(s) 502 may execute instruction 516 to determine to create one or more tunnels among the second clusters and the cluster. The one or more tunnels may be manifested as the data traffic tunnel 302 between the cluster 132 and the cluster 172 in FIG. 3, in particular, between the controller 121 and the controller 123. Another example of the one or more tunnels is illustrated in FIG. 4B, in particular, as the data traffic tunnel 404 between the controller 123 and the controller 423, and as the data traffic tunnel 402 between the controller 121 and 423. The hardware processor(s) 502 may execute instruction 518 to provision the data traffic tunnels, as created according to instruction 516, to transmit data through the data traffic tunnels. The tunnels may include IPSec or GRE tunnels. The provisioning of the tunnels may include setting a protocol for the data traffic tunnels regarding encryption and/or formatting of data to be transmitted through the data traffic tunnels, such as via data packets.

Figure 5B:
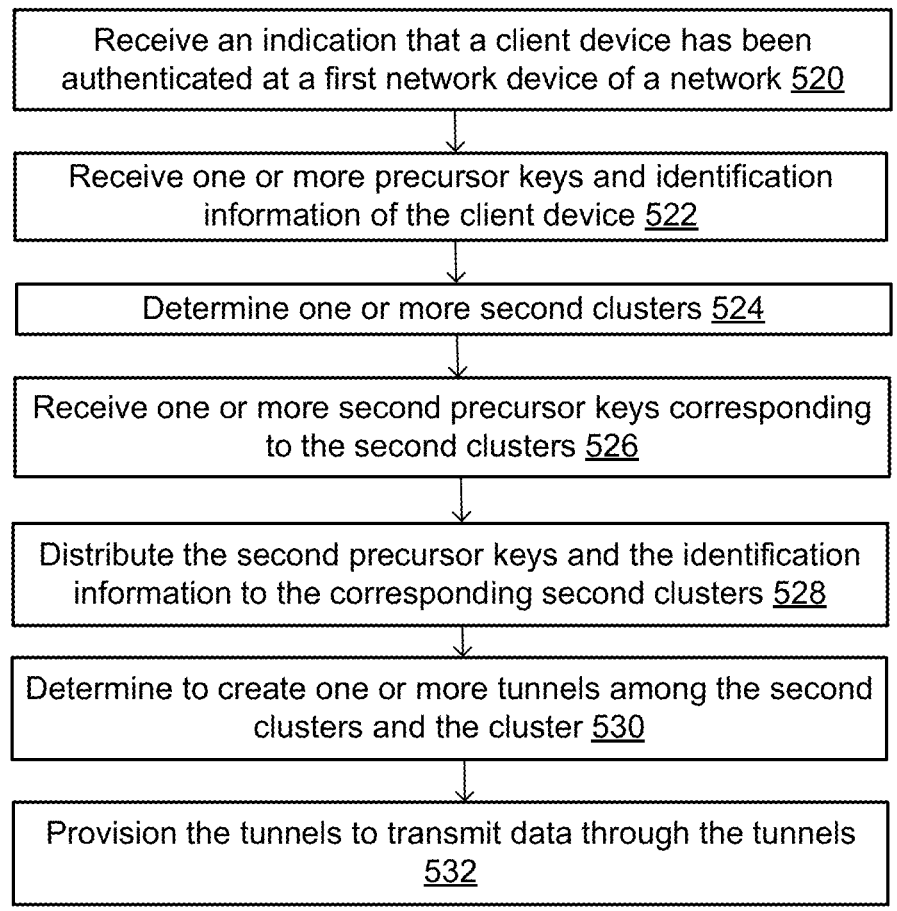
FIG. 5B is a flowchart depicting a method of streamlining a roaming process of client devices among different clusters or subnets, according to examples described in the present disclosure.

FIG. 5B is a flowchart depicting a method of streamlining a roaming process of client devices among different clusters or subnets, according to examples described in the present disclosure. The method may have fewer or greater steps than in the foregoing description, and any practical combination or sequence of steps may be implemented. For example, some steps illustrated in FIG. 5B may be combined with steps illustrated in FIGS. 5C, 5D, and 5E, while other steps may be removed. It should be understood the steps may be reorganized for parallel execution, or reordered, as applicable.

In some examples, the method may be performed by the computing component 111 as illustrated in previous FIG. 1A, 1B, 1C, 2, 3, 4A, 4B, or 4C, and/or the computing component 500 in FIG. 5A. In step 520, the computing component 111 may receive an indication that a client device (e.g., the client device 150) has been authenticated at a first network device (e.g., the access point 120) of a network or a subnet, at a first cluster (e.g., the cluster 132). The first cluster may be a home cluster, in some examples, In step 522, the computing component 111 may receive one or more precursor keys (e.g., the PMK-R1 146) and identification information (e.g., the identification information 156) of the client device. In step 524, the computing component 111 may determine one or more second clusters (e.g., the cluster 172 of FIGS. 1B, 1C, 2, 3, 4B, and 4C, the cluster 372 of FIG. 3, the cluster 472 of FIGS. 4A, 4B, and 4C), such as foreign clusters, that belong to a roaming domain corresponding to the client device and/or the first cluster. In step 526, the computing component 111 may receive one or more second precursor keys corresponding to the second clusters. In step 528, the computing component 111 may distribute the second precursor keys and the identification information to the corresponding second clusters. Thus, the second clusters will be informed regarding how to properly route data traffic upon the client device roaming to any of the second clusters. In step 530, the computing component 111 may determine to create one or more tunnels (e.g., the data traffic tunnel 302 of FIG. 3) among the second clusters and the cluster. In step 532, the computing component 111 may provision or deploy the data traffic tunnels to transmit data traffic through the data traffic tunnels.

Figure 5C:
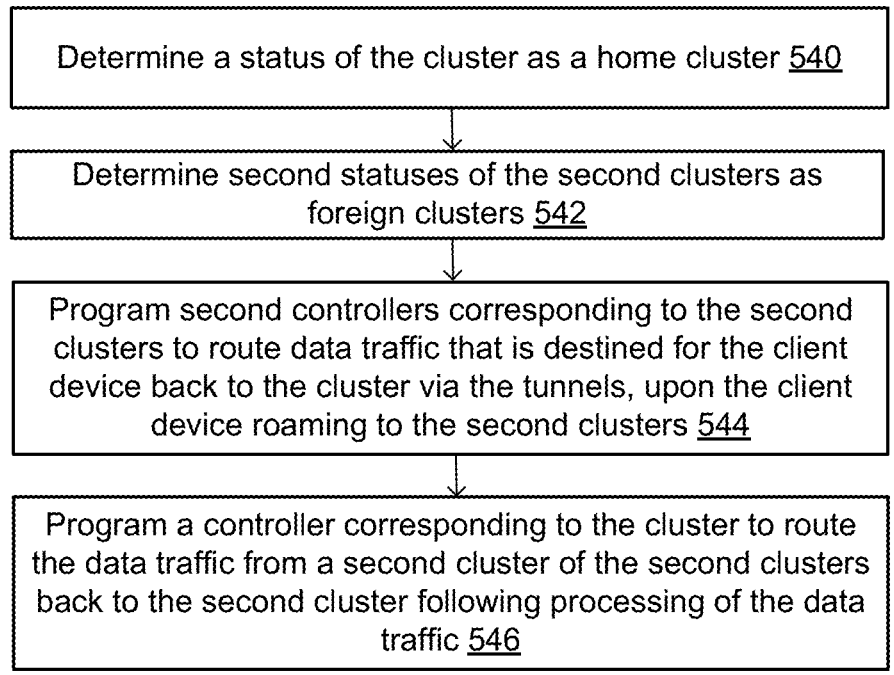
FIG. 5C is a flowchart depicting a method of routing data traffic to properly process the data traffic for a roaming client device, when the roaming client device moves among different subnets, according to examples described in the present disclosure.

FIG. 5C is a flowchart depicting a method of routing data traffic to properly process the data traffic for a roaming client device, when the roaming client device moves among different subnets, according to examples described in the present disclosure. In step 540, the computing component 111 may determine a status of a cluster (e.g., the cluster 132) as a home cluster for a particular client device (e.g., the client device 150). The home cluster may be where data traffic is routed from any foreign clusters in order to properly process the data traffic. In step 542, the computing component 111 may determine second statuses of the second clusters (e.g., the cluster 172) as foreign clusters. In step 544, the computing component 111 may program second controllers (e.g., the controller 123) corresponding to the second clusters to route data traffic that is destined for the client device back to the cluster via the data traffic tunnels, upon the client device roaming to the second clusters. For example, when the second clusters receive, or have received, the identification information in step 528 of FIG. 5B, the identification information may include a subnet to home cluster mapping. The second controllers may be programmed to recognize the subnet from an IP address (e.g., the IP address 199) of a roaming client device and determine, or decipher, from the mapping, the home cluster (e.g., the cluster 132) to which the data traffic is to be routed. In step 546, the computing component 111 may program a controller (e.g., the controller 121) corresponding to the home cluster to reroute the data traffic from a second cluster of the second clusters back to the second cluster following processing of the data traffic by the controller. This rerouting may be through a same data traffic tunnel as used in step 544, in a reverse direction.

Figure 5D:
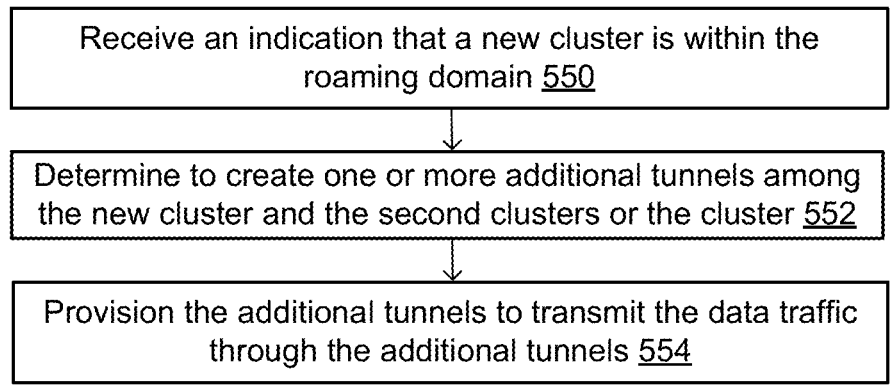
FIG. 5D is a flowchart depicting a method of adaptively forming new tunnels upon additional clusters being added to a roaming domain, according to examples described in the present disclosure.

FIG. 5D is a flowchart depicting a method of adaptively forming new tunnels upon additional clusters being added to a roaming domain, according to examples described in the present disclosure, and as further elaborated upon in FIGS. 4A and 4B. In step 550, the computing component 111 may receive an indication that a new cluster is within the roaming domain. In step 552, the computing component 111 may determine to create one or more additional tunnels among the new cluster and the second clusters or the cluster. For example, in FIG. 4B, the computing component 111 may determine to create the data traffic tunnel 302 between the controller 121 of the cluster 132 and the controller 123 of the cluster 172, the data traffic tunnel 404 between the controller 123 of the cluster 172 and the controller 423 of the cluster 472, and the data traffic tunnel 402 between the controller 121 of the cluster 132 and the controller 423 of the cluster 472. In step 554, the computing component 111 may create the additional tunnels and provision the additional tunnels to transmit the data traffic through the additional tunnels. Thus, the computing component 111 may adapt to changes among subnets of a network and scale a number of tunnels as subnets and/or a network expands.

Figure 5E:
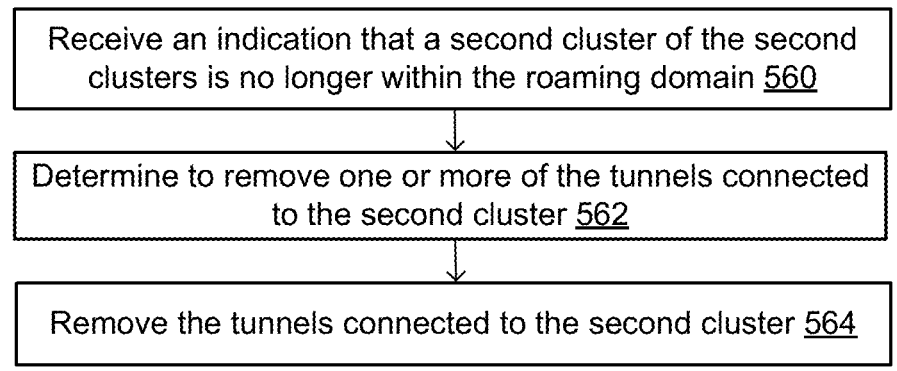
FIG. 5E is a flowchart depicting a method of adaptively removing tunnels upon a removal of clusters from a roaming domain, according to examples described in the present disclosure.

FIG. 5E is a flowchart depicting a method of adaptively removing tunnels upon a removal of clusters from a roaming domain, according to examples described in the present disclosure, and as further elaborated upon in FIG. 4A. In step 560, the computing component 111 may receive an indication that a second cluster of the second clusters is no longer within the roaming domain. For example, in FIG. 4A, the cluster 172 may have either been rendered inoperative, or otherwise have been removed. In a specific example, the controller 123 may no longer be operative. In step 562, the computing component 111 may determine to remove one or more of the tunnels connected to the second cluster. For example, in FIG. 4A, the previous tunnel 302 between the controller 121 of the cluster 132 and the controller 123 of the cluster 172 may be removed, to conserve resources that would otherwise be consumed to maintain the previous tunnel 302. In step 564, the computing component 111 may remove the one or more of the tunnels connected to the second cluster.

In general, the word "component," "system," "component," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that may be installed, decompressed or decrypted prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as a storage device. Volatile media includes dynamic memory, such as a main memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise a bus. Transmission media can also take the form of acoustic or light waves, such as those generated during radio-wave and infra-red data communications.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through a communication interface coupled to a bus. The communication interface may carry the digital data to and from a computer system such as the computing component 111.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as the computing component 111.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

What is claimed is:

1. A method comprising:
   receiving, by a precaching server, an indication that a client device has been authenticated at a first network device of a network, the client device being authenticated by an authentication server, the first network device belonging to a first cluster corresponding to a first level 3 (L3) subnet, the precaching server being remote from the first network device;
   receiving, by the precaching server, one or more first precursor keys and identification information of the client device, wherein the first precursor keys were generated from the authentication of the client device;
   determining, by the precaching server, one or more second clusters, wherein:
      the second clusters comprise remaining clusters, besides the first cluster, that are within a roaming domain of the first cluster or the client device; and
      each of the second clusters corresponds to a different L3 subnet;
   receiving, by the precaching server, one or more second precursor keys corresponding to the second clusters;
   distributing, by the precaching server, the second precursor keys and the identification information to the corresponding second clusters;
   determining, by the precaching server, to create one or more tunnels among the second clusters and the first cluster; and
   provisioning, by the precaching server, the tunnels to transmit data traffic through the tunnels to a second network device, the second network device belonging to one of the second clusters, the precaching server being remote from the second network device.

2. The method of claim 1, further comprising:
   determining a status of the first cluster as a home cluster;
   determining second statuses of the second clusters as foreign clusters; and
   programming second controllers corresponding to the second clusters to route data traffic that is destined for the client device back to the first cluster via the tunnels, upon the client device roaming to the second clusters.

3. The method of claim 2, further comprising:
   programming a controller corresponding to the first cluster to route the data traffic from a second cluster of the second clusters back to the second cluster following processing of the data traffic.

4. The method of claim 1, wherein the determination to create the tunnels comprises determining to create tunnels among each of the second clusters and the first cluster such that the tunnels among the second clusters and the first cluster form a full mesh topology.

5. The method of claim 1, further comprising:
   receiving an indication that a new cluster is within the roaming domain;
   determining to create one or more additional tunnels among the new cluster and the second clusters or the first cluster; and
   provisioning the additional tunnels to transmit the data traffic through the additional tunnels.

6. The method of claim 1, further comprising:
   receiving an indication that a second cluster of the second clusters is no longer within the roaming domain;
   determining to remove one or more of the tunnels connected to the second cluster; and
   removing the tunnels connected to the second cluster.

7. The method of claim 1, wherein the identification information comprises any of a role and a VLAN assignment of the client device.

8. The method of claim 7, wherein the identification information comprises a role of the client device, and the role comprises access privileges or policies for the client device.

9. The method of claim 1, wherein the tunnels comprise IPSec tunnels.

10. The method of claim 1, wherein the first precursor keys and the second precursor keys comprise PMK (Pairwise Master Key)-R1s or PMKs.

11. A computing system comprising:
    one or more processors; and
    a memory storing instructions that, when executed by the one or more processors, cause the one or more processors to:
       receive an indication that a client device has been authenticated at a first network device of a network, the client device being authenticated by an authentication server, the first network device belonging to a first cluster corresponding to a first level 3 (L3) subnet, the computing system being remote from the first network device;
       receive one or more first precursor keys and identification information of the client device, wherein the first precursor keys were generated from the authentication of the client device;
       determine one or more second clusters, wherein:
          the second clusters comprise remaining clusters, besides the first cluster, that the client device has historically roamed to;
       receive one or more second precursor keys corresponding to the second clusters;
       distribute the second precursor keys and the identification information to the corresponding second clusters;
       determine to create one or more tunnels among the second clusters and the first cluster; and
       provision the tunnels to transmit data traffic through the tunnels to a second network device, the second network device belonging to one of the second clusters, the computing system being remote from the second network device.

12. The computing system of claim 11, wherein the instructions further cause the one or more processors to:
- determining a status of the first cluster as a home cluster;
- determining second statuses of the second clusters as foreign clusters; and
- programming second controllers corresponding to the second clusters to route data traffic that is destined for the client device back to the first cluster via the tunnels, upon the client device roaming to the second clusters.

13. The computing system of claim 12, wherein the instructions further cause the one or more processors to:
- programming a controller corresponding to the first cluster to route the data traffic from a second cluster of the second clusters back to the second cluster following processing of the data traffic.

14. The computing system of claim 11, wherein the determination to create the tunnels comprises determining to create tunnels among each of the second clusters and the first cluster such that the tunnels among the second clusters and the first cluster form a full mesh topology.

15. The computing system of claim 13, wherein the second clusters comprise remaining clusters, besides the first cluster, that are within a roaming domain of the first cluster or the client device, and wherein the instructions further cause the one or more processors to:
- receive an indication that a new cluster is within the roaming domain;
- determine to create one or more additional tunnels among the new cluster and the second clusters or the first cluster; and
- provision the additional tunnels to transmit the data traffic through the additional tunnels.

16. The computing system of claim 11, wherein the second clusters comprise remaining clusters, besides the first cluster, that are within a roaming domain of the first cluster or the client device, and wherein the instructions further cause the one or more processors to:
- receive an indication that a second cluster of the second clusters is no longer within the roaming domain;
- determine to remove one or more of the tunnels connected to the second cluster; and
- remove the tunnels connected to the second cluster.

17. The computing system of claim 11, wherein the identification information comprises any of a role and a VLAN assignment of the client device.

18. The computing system of claim 17, wherein the identification information comprises a role of the client device, and the role comprises access privileges or policies for the client device.

19. A non-transitory storage medium storing instructions that, when executed by at least one processor of a computing system, cause the computing system to:
- receive an indication that a client device has been authenticated at a first network device of a network, the client device being authenticated by an authentication server, the first network device belonging to a first cluster corresponding to a first level 3 (L3) subnet, the first network device disposed separately from the computing system;
- receive one or more first precursor keys and identification information of the client device, wherein the first precursor keys were generated from the authentication of the client device;
- determine one or more second clusters, wherein:
  - the second clusters comprise remaining clusters, besides the first cluster, that are within a roaming domain of the first cluster or the client device; and
  - each of the second clusters corresponds to a different L3 subnet;
- receiving one or more second precursor keys corresponding to the second clusters;
- distribute the second precursor keys and the identification information to the corresponding second clusters;
- determine to create one or more tunnels among the second clusters and the first cluster; and
- provision the tunnels to transmit data traffic through the tunnels to a second network device, the second network device belonging to one of the second clusters, the second network device disposed separately from the computing system, wherein the client device maintains its original Internet Protocol (IP) address corresponding to the first cluster, when the client device roams to the second clusters.

20. The non-transitory storage medium of claim 19, wherein the identification information comprises a mapping between a subnet within the original IP address and the first cluster, and wherein the instructions further cause the computing system to:
- monitor a transmission of data traffic between second controllers corresponding to the second clusters and a controller corresponding to the first cluster.

* * * * *